(12) United States Patent
Fleishman

(10) Patent No.: US 6,767,213 B2
(45) Date of Patent: Jul. 27, 2004

(54) SYSTEM AND METHOD FOR ASSESSING ORGANIZATIONAL LEADERSHIP POTENTIAL THROUGH THE USE OF METACOGNITIVE PREDICTORS

(75) Inventor: Edwin A. Fleishman, Potomac, MD (US)

(73) Assignee: Management Research Institute, Inc., Potomac, MD (US)

( * ) Notice: Subject to any disclaimer, the term of this patent is extended or adjusted under 35 U.S.C. 154(b) by 0 days.

(21) Appl. No.: 10/097,608

(22) Filed: Mar. 15, 2002

(65) Prior Publication Data

US 2003/0008270 A1 Jan. 9, 2003

Related U.S. Application Data

(60) Provisional application No. 60/276,674, filed on Mar. 17, 2001.

(51) Int. Cl.[7] .............................................. G09B 19/00
(52) U.S. Cl. .......................... 434/236; 434/322; 705/14
(58) Field of Search ................................ 434/236, 238, 434/322, 323, 307 R, 330, 383, 362; 705/11, 14

(56) References Cited

U.S. PATENT DOCUMENTS

| | | | |
|---|---|---|---|
| 5,326,270 A | | 7/1994 | Ostby |
| 5,909,669 A | * | 6/1999 | Havens ........................ 705/11 |
| 5,911,581 A | | 6/1999 | Reynolds |
| 6,007,340 A | | 12/1999 | Morrel |
| 6,030,226 A | | 2/2000 | Hersh |
| 6,112,049 A | * | 8/2000 | Sonnenfeld .................. 434/350 |
| 6,164,975 A | | 12/2000 | Weingarden |
| 6,361,326 B1 | * | 3/2002 | Fontana et al. ............. 434/322 |
| 2002/0072040 A1 | * | 6/2002 | Bajer et al. .................. 434/236 |
| 2002/0076678 A1 | * | 6/2002 | Westh ........................ 434/236 |
| 2002/0198765 A1 | * | 12/2002 | Margino et al. ............... 705/11 |

OTHER PUBLICATIONS

"Development and Evaluation of Cognitive and Metacognitive Measures for Predicting Leadership Potential," Joanne C. Marshall–Miles et al., Leadership Quartley, 11(1), 135–153, Elsevier Science Inc. (2000).

* cited by examiner

Primary Examiner—Teresa Walberg
Assistant Examiner—Kathleen M. Christman
(74) Attorney, Agent, or Firm—Dykema Gossett PLLC

(57) ABSTRACT

Disclosed is a system and method of assessing cognitive and metacognitive skills and leadership abilities used in the creative problem solving process central to leader effectiveness. The system and method provide a new model of leader performance and a validated computer based assessment battery. The system and method present scripted scenarios configured to activate a problem solving process resulting in the construction of a mental representation of the problem and requiring the selection of a set of alternative responses. The system and method define and operationalize six leadership abilities in terms of the requisite cognitive and metacognitive skills. A computerized interactive assessment battery measures these abilities by presenting six scenarios describing situations and events requiring large scale organizational interventions that require the use of these leadership abilities. The system and method measures these abilities by requiring the examinee to select, prioritize, and modify his response set in accordance with continuously updated information provided. The system and method quantify the abilities measured in terms of ability profiles and generate and display immediate feedback to the examinee in terms of normative profiles based on the scores. The assessment data is stored on a removable disk or web server for use in developing an individually tailored leadership training program based on the specific leadership ability profile identified by the use of the systems and methods leadership model.

47 Claims, 7 Drawing Sheets

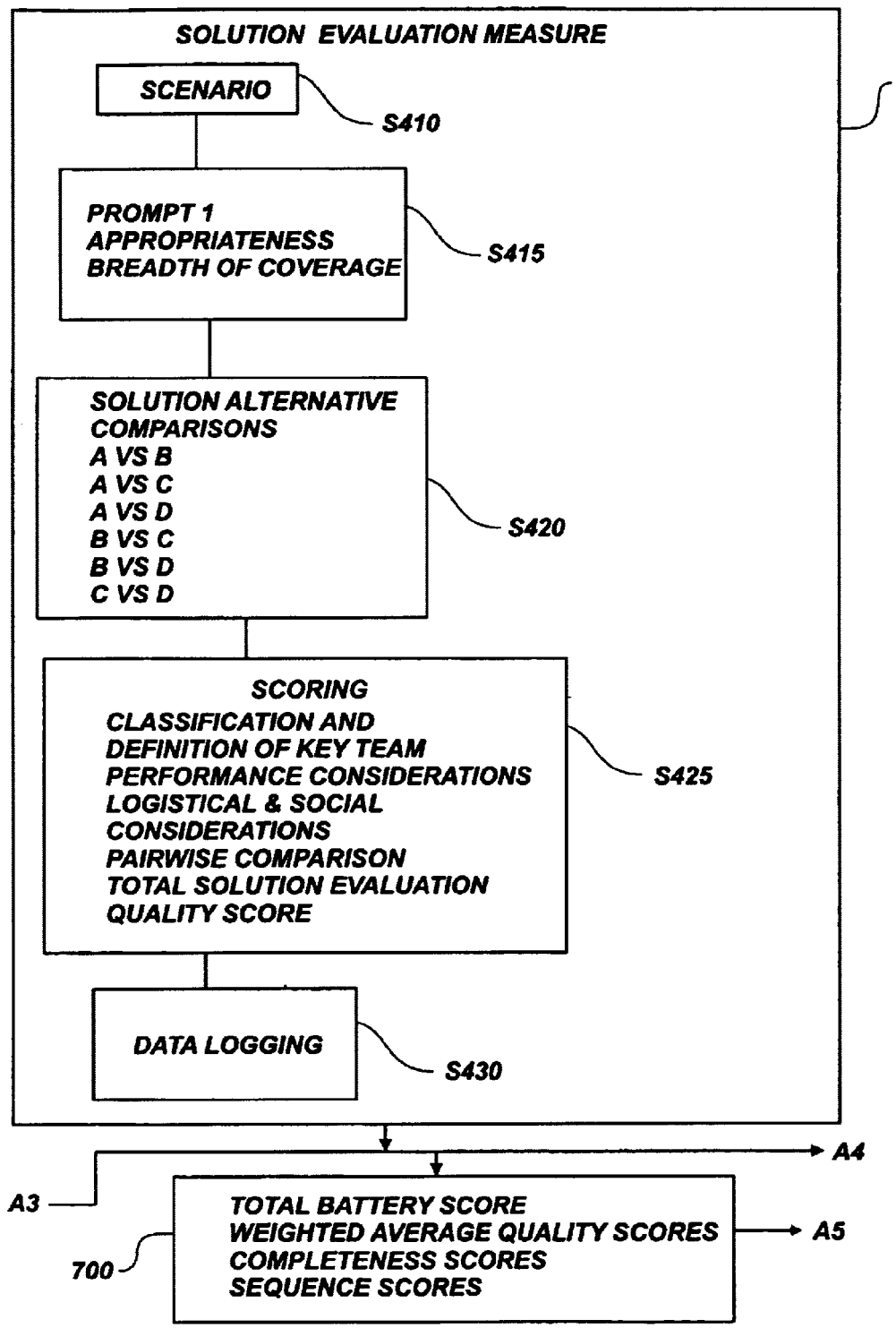

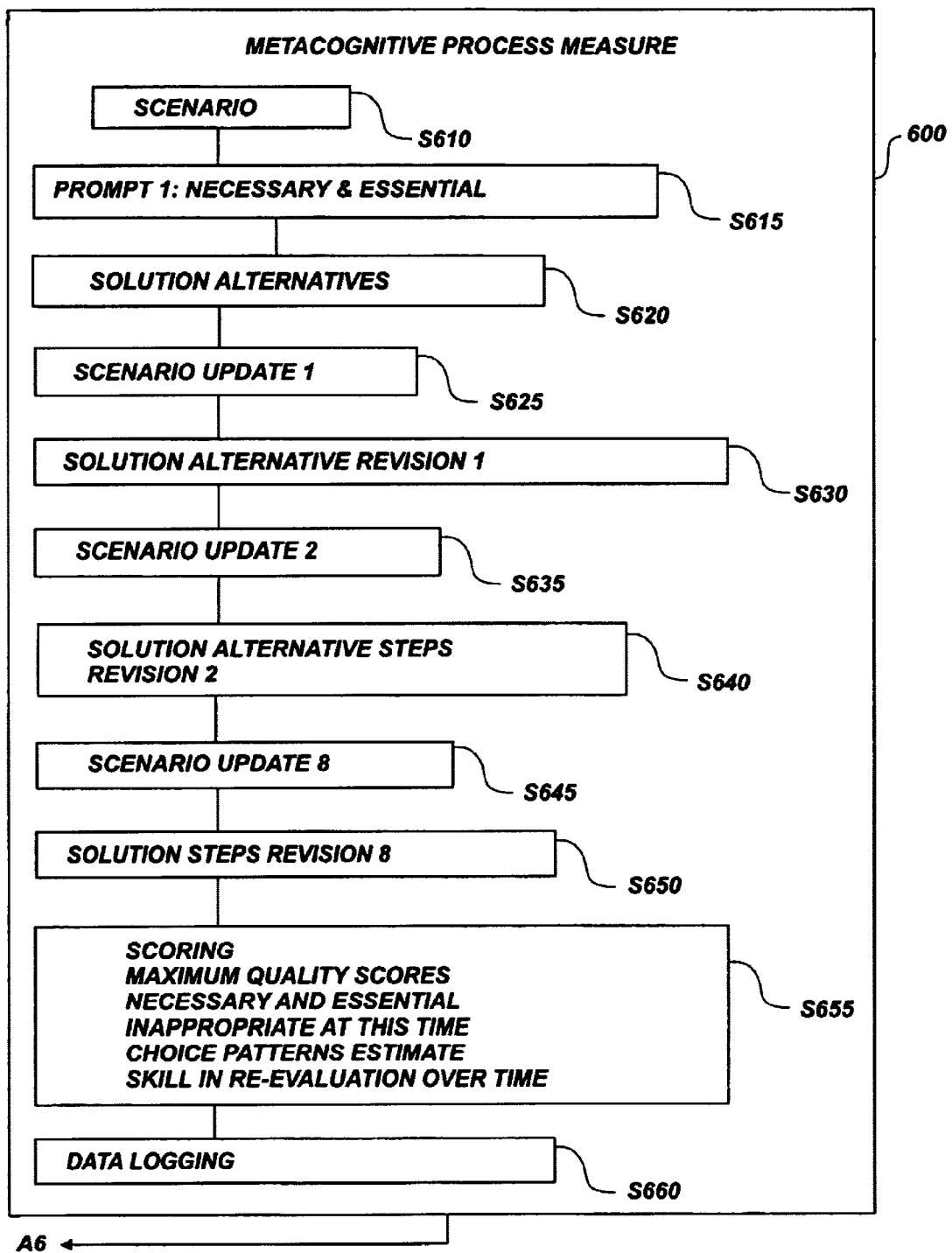

SYSTEM AND METHOD FOR ASSESSING ORGANIZATIONAL LEADERSHIP POTENTIAL THROUGH THE USE OF METACOGNITIVE PREDICTORS

CROSS REFERENCE TO EARLIER APPLICATION

This application incorporates and claims the benefit of U.S. Provisional Application Serial No. 60/276,674, filed Mar. 17, 2001, by Edwin Fleishman et al., entitled Metacognitive Leadership Exercises.

BACKGROUND OF THE INVENTION

For many years, a primary method for assessing the cognitive abilities of individuals has been by means of paper and pencil tests. However, paper and pencil tests have limited flexibility, do not present realistic ways of responding, do not provide immediate feedback of an examinee's performance, and are costly with respect to scoring time and personnel requirements to administer them. Additionally, many situations exist in which such tests are inappropriate or have severe limitations for assessing higher level cognitive processes. There is a need, for example, for better methods of assessment of the cognitive and metacognitive skills required by managers and executives, especially those at the upper levels of organizations.

Such assessments are needed to identify executive leadership potential in assessment and promotion of managers and as a basis for executive development and training programs. Until recently, these skills were not fully identified or sufficiently validated. Also, measurement of such skills has been limited in the kinds and variety of responses appropriate to high level strategic decision making and problem solving. Recent research has identified the cognitive and metacognitive skills related to effective leadership in complex organizations, for example general problem solving, planning and implementation, solution construction, solution evaluation, social judgment and metacognitive processes. See, for example, *Development And Evaluation Of Cognitive And Metacognitive Measures For Predicting Leadership Potential,* Joanne C. Marshall-Mies and Edwin A. Fleishman et al., Leadership Quarterly, 11(1), 135–153. However, no testing methods and computerized means for measuring these cognitive and metacognitive skills related to effective leadership are available. What are needed are a computerized testing device for and method of assessing cognitive and metacognitive capabilities.

SUMMARY OF THE INVENTION

The objective of this invention is to provide a computer-based cognitive and metacognitive skill assessment and development tool suitable for implementation in supporting executive development. Current research on performance at mid and top levels of large scale organizations strongly suggests that cognitive and metacognitive skills are required for successful executive-level performance. Cognitive conceptual (integrative) skills are very important. However, the cognitive skill of self-awareness (metacognition) is critical, in that it involves the self-generated feedback and iterative evaluation process used in complex problem solving and decision-making.

The invention of the Metacognitive Leadership Exercises (MLE) assesses cognitive and metacognitive skills used in unstructured problem solving skills central to leader effectiveness. This is the primary reason for the existence of the invention. Use of this invention will provide critical information related to effective organizational management requirements.

The first task is to design the MLE measures to be appropriate for the proposed management population and to focus on strategic leadership and decision-making. Use of scenarios, prompts, responses, and a unique scoring methodology resulted in a computer-based assessment battery including six metacognitive measures (General Problem Solving, Planning & Implementation, Solution Construction, Solution Evaluation, Social Judgment, and Metacognitive Process) and a background questionnaire.

The second task was to demonstrate the reliability and construct- and criterion-related validity of the MLE measures. This involves an experimental study relating the MLE scores, a performance criterion measure, measures of related constructs (correlates), and collecting and analyzing the data. The study evaluated six MLE measures and a background questionnaire, a performance criterion, and three sets of correlates, i.e., the Modified Career Path Appreciation Scale or MCPA, seven MANSPEC variables, and four Myers-Briggs Type Indicator® (MBTI®) scores.

In using the MLE, the examiner is asked to participate via written materials and distribution of a disk which installs the MLE instructions and exercises, collects and scores the data, and installs the software. Participants complete the MLE using IBM-compatible computers with Microsoft Windows operating systems, in a job related validation study conducted at the National Defense University. Internal and external analyses are preferably conducted to determine the sample representativeness and the reliability and construct- and criterion-related validity of the MLE measures. The results are as follows.

Self-administration of the MLE on a variety of pcs and laptops running Windows and Unix was successful. Over 96 percent of the participants had no technical difficulties executing or completing the MLE measures, and over 94 percent made no comments or made positive comments about their experience with the MLE instructions and exercises.

The multiple-item MLE measures were reliable or internally consistent as evidenced by moderate to high alpha coefficients of 0.53 to 0.84 for Average Quality on the General Problem Solving, Social Judgment, and Metacognitive Process measures and 0.85 for Maximum Quality on the Metacognitive Process measure. The high level managerial population places severe time constraints on the data collection. Applying the Spearman-Brown correction formula, it is estimated that reliability would be increased significantly if the measures were doubled, i.e., to a range of 0.70 to 0.91 for General Problem Solving and Social Judgment and to a range of 0.89 to 96 for the highly reliable Metacognitive Process measure. These results reveal that individual differences in scores obtained by high level executives produce consistent results on these measures of metacognitive skill.

The MLE score distributions indicate that senior level individuals differ in performance on the MLE measures; the large standard deviations indicated a considerable range of scores for any given measure. These findings, especially given the unique sample, confirmed that the MLE scores reflect individual differences in the skills measured. Also, relatively low to moderate inter-correlations among component MLE measure scores confirmed partial independence of the measures and provided evidence that the measures tap different dimensions of problem solving associated with leadership skills.

MLE measures are slightly to moderately related to several correlates, showing a convergence between the constructs measured. Of particular interest is the significant but moderate correlation of General Problem Solving and Social Judgment with the MCPA, a work sample which taps work disposition as articulated by the subject and judged by the interviewer and which shows how discretion is exercised and how the person copes with complexity. It purports to measure fluid intelligence, concept formation, insight/intuition, comfort with ambiguity/uncertainty, and characteristic strategies and feelings about work. Also of interest is the correlation of General Problem Solving and Social Judgment with Analytical Skills, a Holland Vocational Preference Inventory score which indicates a preference for using one's analytical and problem solving abilities and for using intelligence to achieve ends.

The MLE General Problem Solving and Social Judgment measures provide positive correlations with MCPA and Analytical Skills. Two multiple regression analyses are conducted using the MCPA as the dependent variable. The first is a simultaneous multiple regression with General Problem Solving and Social Judgment as independent variables. Together, the MLE measures show a multiple correlation of 0.38 ($p<0.01$), with General Problem Solving representing unique variance in predicting the MCPA. The second regression enters Analytical Skills first, followed by the simultaneous addition of the MLE scores. This results in a multiple correlation of 0.60 ($p<0.01$), with Analytical Skills representing unique variance in predicting the MCPA and General Problem Solving approaching but not reaching the level required to represent unique variance.

A Distinguished Graduate (DG) criterion of performance significantly correlates with two MLE measures, i.e., Solution Construction®=0.30, $p<0.01$) and Metacognitive Process®=0.40, $p<0.01$). These coefficients indicate a robust relationship between these MLE measures and the performance criterion. A simultaneous multiple regression was then performed with DG points as the dependent variable and the most valid Solution Construction and Metacognitive Process scores as independent variables. These two MLE measures showed a multiple correlation of 0.47 ($p<0.01$), with each measure representing unique variance in predicting the performance criterion.

The invention is used for the assessment and development of metacognitive skills. Metacognition can be reliably measured using several of the MLE performance measures. Two of the MLE measures are valid predictors of the class rank criterion (DG). The measurement of these important leadership skills focuses on evaluation of the MLE measures: (1) as measures of the effectiveness of training on metacognitive problem-solving skills in the area of strategic decision making; (2) as a screening tool for the early identification and development of problem-solving and decision-making skills, including metacognitive skills; and (3) to assess their validity against more objective, varied performance criteria and with varied populations. MLE includes tactical and operational as well as strategic-level decision-making and problem-solving.

This invention includes certain considerations in developing a computerized assessment of metacognitive skills and a description and justification for the design of the computerized Metacognitive Leadership Exercises (MLE) to measure metacognitive skills. The first section discusses issues related to the general characteristics of the assessments. The focus of the present invention is on the assessment of high-level cognitive skills, that is, metacognitive skills. Metacognitive skills are defined as high-level expertise in the conscious evaluation and regulation of problem construction, solution generation and implementation processes. The invention describes general design features to be included in the assessment instruments and shows how these general design features relate to the development of reliable and valid measures of metacognitive skills.

Traditional, trait-based psychometric assessment is concerned with ordering people with respect to their levels of particular, and often empirically defined, attributes or abilities. Examples of traditional assessments include the General Aptitude Test Battery (GATB) and the Scholastic Aptitude Test (SAT). Such measures are practical, effective tools for the selection issues they were designed to address. While effective at selecting and classifying people based on individual differences in level of performance, these measures are not designed to allow assessment of the cognitive processes or strategies people use in performance. Traditional measurement, consistent with the prevailing behaviorist tradition in which it was developed, treats the mind and its functioning as a "black box." The interest here is typically with performance based on stable, enduring behavioral characteristics.

In contrast, cognitive assessments are concerned with assessing how people know what they know, do what they can do, and the ways in which they can increase these capacities. To accomplish these goals, cognitive psychologists have attempted to assess the mind's operations, or processes. Work in this area has both focused on lower-level, biologically linked automatic mental operations and higher-level, learned mental operations. Such cognitive processes have been classified as fast or slow, with the latter being the focus of the present invention. It is useful to contrast how researchers have investigated fast and slow cognitive processes to clarify the nature of metacognitive skills.

A good deal of work has gone into investigating fast cognitive processes. These processes operate automatically, beneath the level of awareness, and are generally measured by response latencies to task components, error rates, or direct measures of people's eye movements and neurophysiology. The operation of fast, automatic cognitive processes, e.g., information encoding, is independent of domain-specific knowledge and skills. These fast, automatic processes are not directly observable. Therefore, their measurement depends on the extent to which the assessment design provides an adequate basis for inferring that hypothesized, unseen mental processes are contributing to observable indices of performance. Fast processes are measured in the laboratory with simple cognitive tasks such as analogies or spatial visualization items drawn from psychometric ability tests. Examples include the stimulus encoding, memory search-and-mapping, and evaluation operations comprising components of various problem solving models.

Leader cognitive skills targeted in the present invention are metacognitive skills. Metacognitive skills are slow process skills because, by definition, metacognition is subject to introspection, that is, awareness. Slow, complex skills require the use of prior knowledge, and include such activities as complex problem solving, monitoring of complex systems, etc. Measurement approaches for complex cognitive skills have reflected the finding that these skills are conscious, directly observable control processes. Accordingly, researchers have generally measured such complex cognitive skills by presenting people with tasks intended to elicit their application. This is identical to common assessment practices in education and industry, where the goal of assessment is to find out an individuals knowledge and skill with respect to some absolute standard.

The design of the tasks may often only reflect a simple consensus of expert opinion as to their appropriateness and power to elicit the skill, that is, its face- and content-validity. In responding to the task, people provide open-ended verbal and behavioral records or retrospective interviews are used to record observations.

No matter whether automatic (fast) or controlled (slow) processes are the objects of assessment, cognitive assessments must be designed far more carefully than traditional psychometric measures. Their design must rely not only on empirical findings, but also on substantive theory, and the theory underlying the assessment design must specify (a) which cognitive operations contribute to performance, and (b) the sequence of these operations. Task components comprising the assessment must reflect links to components of the specified theoretical model at each stage of the design. Such integration provides the basis for establishing the construct validity of assessment of the unseen, automatic mental operations. Efforts to solve the inferential validity issues raised by cognitive research have led not only to experimentally-based methodologies for cognitive measurement, but also to the development of powerful new methodologies linking the experimental and psychometric approaches.

Tasks that are appropriate for assessing cognitive skills in general include any task designed to investigate how people perceive, understand, acquire, and use knowledge. Examples of such cognitive tasks range from school learning tasks to educational and psychological tests. What is crucial is that the tasks are designed so that the inferential statements resulting from the observations are strong, and speak to the validity of the assessment. That is, performance on the assessment should call forth the intended cognitive or metacognitive skill, and be related in the expected way to real-world performance.

There are other issues bearing on the design of the assessments. Such considerations are the cost and practicality of administering metacognitive skills assessments are particularly important in the present invention. In the following sections, a brief summary of current approaches to metacognitive skill assessment is presented, followed by a discussion of specific task design considerations bearing on the strength and validity of the inferences derived from Management Leadership Exercises. In particular, the focus is on presenting an alternative to open-ended responses that meet these criteria and offer a solution to the issues of practicality and cost.

Metacognitive Leadership Exercises Design Characteristics

Metacognitive Assessment

Researchers have devised several ways to assess metacognitive skills. These different approaches reflect the fact that metacognitive assessment should be tailored to fit the nature of the skills and the theoretical model posited to underlie performance. For example, a text-faulting procedure investigates metacognitive performance of adults while reading. The specific metacognitive skill investigated was the monitoring of reading comprehension. People were asked to detect faults in written material that could be of any one of seven different kinds. These faults ranged from superficial, such as spelling errors, to more abstract, such as incongruent semantic relationships. Planning skills were assessed via a computer task in which people were asked to travel to several locations displayed on the screen, starting from an established "home" location. Data obtained include the time between the initial presentation of the problem and initial move, and between the subsequent moves, and measures of the total distance traveled by the moves. A "think aloud" methodology assessed planning in electronic troubleshooting tasks. Novice and expert troubleshooters were presented with a problem and asked to suggest hypotheses, state plans, and specify the steps they expected to take in solving the problem. Those protocols were mapped onto the replaceable electronic components people selected. This mapping revealed that experts used only relevant electronic components and their plans showed a systematic and linked transition in making these choices. In contrast, the mappings of many novices showed that they tended to use irrelevant components in a series of unsystematic and unrelated action steps. Assessment of metacognitive skill within a specific domain decomposed physics problems into a solution plan and an executed plan, each of which could be further decomposed into sub-activities of identifying a concept or procedure and justifying its selection. After identifying relevant principles and justifications for their application, the individual could then execute the plan and solve the problem. The assessment approach incorporated response option formats ranging from completely open-ended to fixed choice.

Several specific characteristics of these metacognitive skill assessment methodologies were used for the design of Metacognitive Leadership Exercises. First, all of the tasks described are complex tasks. As discussed later in more detail, complex tasks are required to adequately assess complex performance.

Second, the tasks are skill-specific. For example, planning skill is elicited by a task involving planning, and reading comprehension by one in which people read complex material. Thus, for tasks assessing high-level complex cognition, the face- and content-validity of the task must carry a good deal of the burden for helping to establish inferences that the targeted metacognitive skill is being elicited.

Third, a variety of response alternatives are incorporated, ranging from the content analysis of think-aloud protocols to time-on-task (as contrasted with response "latencies," per se). The complexity, skill-specificity, and variety of responses that are characteristic of current measures of metacognitive skills underscore an important point: Complex cognition, occurring as it does at the level of awareness, does not require the elaborate response latency and error rate analysis typical of measures of unconscious cognitive processes. In fact, the meaning of pure latency variables, problematic as it is in studies of low-level cognition, is far more questionable for complex cognition. For example, a fast latency of response to a component of a complex task may reflect either the automatic application of highly elaborated, expert knowledge and skills, or lack of effort or inattention. We have no way of knowing which, given only the latency value. Instead of latencies, however, sound inferences regarding the application of the targeted high-level skills may be made by judiciously structuring the task and observing qualitative differences in the content of responses. It is this incorporation of qualitative assessment into the measurement design that helps capture the process application and strategic differences that reflect metacognitive skill. Nevertheless, a travel planning paradigm of time-on-task may be used to provide indices of complex metacognitive skills when its substantive meaning can be established.

The theoretical models underlying performance on the high-level tasks are more general, as prescribed by the conscious, observable nature of the targeted metacognitive skills. For example, component models of the fast process skills contributing to performance of analogical reasoning items specify sequential encoding, search and mapping, evaluation, and response operations. A tightly integrated set of testable hypotheses represented their application. In contrast, the examples of metacognitive assessments sketched out above provide no such explicit sequence of operations. Instead, inferences regarding the application and level of the targeted cognitive skills are made based on the nature of the task and accompanying responses.

MLE Design Criteria

MLE design criteria are described, focusing on six critical aspects: complexity, level of domain specificity, fidelity, response type, administration, and scoring.

Design of cognitive assessments' items, structure, and response format represents the "observational design." The purpose of the observational design is to structure the observations available from the task so that defensible inferences about the nature of the targeted skill can be made from the observations. General factors bearing on the nature of the observational design of the MLE are elaborated.

The MLE measures were developed to have the following characteristics:

complexity
domain specificity
fidelity
construct-based, fixed response format/

Complexity. Assessments of complex cognitive skills require tasks. Complex tasks are distinguished from simple tasks by their requirement for integration of diverse knowledge and skills. Cognitive psychologists classify tasks requiring the integration of diverse knowledge and skills as unstructured, ill-defined tasks. Of course, complex cognition, such as introspection, may occur during the performance of simple tasks. Simple tasks, however, do not allow people the opportunity to express the complex cognitive skill in a sufficient variety of ways. Therefore, typical items from standard ability tests do not make informative cognitive tasks. Thus, the most useful information that may be obtained from cognitive assessment is detecting the important differences in the way people complete the assessments, that is, perform the tasks. Assessing metacognitive and other complex knowledge and skills incorporates complex exercises.

Complex tasks are useful in the design of cognitive assessments. First, complex tasks allow integration of more requisite performance dimensions. This provides a basis for better assessing qualitative differences between individuals on their capacity to integrate what they know for task performance. Second, complex tasks provide multiple "snapshots" or ways of representing performance. The resulting larger set of potentially useful variables can provide the patterns of convergent and divergent relationships and interactions that will evidence the construct validity of the skill assessments. Third, complex tasks allow for the assessment of awareness. Evidence for awareness is important to establish that the targeted metacognitive skill is being applied. Finally, measures derived from performance on complex tasks are better at classifying individuals with respect to their stage of development. Qualitative assessments of complex tasks can thus allow assessments of current readiness for acquiring new knowledge, that is, future potential, thus providing an important link to the development of training interventions.

Domain specificity. Measures of metacognitive skills may be designed to reflect either a general or domain-specific focus. Metacognitive skills are not tied to specific domains, given the dependency of complex cognition on existing knowledge and skills, it is not surprising that others have accrued evidence that at least some metacognitive skills are domain-specific. An objective of this invention, however, is to assess metacognition in leaders. Domain-specific metacognitive skills may be both relevant to real-world performance and amenable to training. Needs exist to assess the metacognitive skills used by mid-level leaders in creative problem solving. Further, needs exist to assess the training feasibility of these skills as they are applied by leaders. Accordingly, the tasks in the example are constructed for assessments to reflect leadership content.

Designing tasks to reflect leadership content strengthens the design of the assessments in three ways. First, stronger inferences can be made from tasks with leadership content about the likelihood that leader task performance will generalize to real-world problems. This is because the tasks may take the form of a simulation. Second, stressing content and process enhances the likelihood that task performance reflects the targeted metacognitive skills for all individuals, that is, scores on the assessment will mean the same thing for all individuals. For example, some leaders in intensive training may be more likely to react negatively to non-leadership scenarios. Such tasks may seem irrelevant, because the tasks are perceived as unrelated to their training. For those who react negatively, task performance may reflect something other than the application of the targeted metacognitive skill. Finally, the use of leadership scenarios will elicit maximal performance from the examinees, as they may better use existing knowledge and skills in task performance.

Fidelity. An issue in the design of any assessment is its fidelity, or the extent to which it mimics a real-world task. There is a good deal of evidence that low-fidelity simulations might be more than adequate for eliciting requisite skills and permitting reliable observations. Specific examples of a class of viable low-fidelity tasks are represented by "controlled simulation" tasks. Controlled simulations are complex tasks that represent a compromise between rigid traditional tester-controlled observational settings and the wholly unstructured observational setting found in the real world.

The purpose of any simulation is to approximate a realistic situation so that one can generalize from simulation performance to real-world performance. Controlled simulations satisfy this ability to generalize criterion. Controlled simulations include the use of written scenarios. Controlled simulations have been used most prominently in the arena of medical education in patient management problems. For example, a simulated patient (via written or oral dialogue) presents the examinee with initial symptoms; the examinee requests tests, considers their results, prescribes treatments, and monitors their effects, generally attempting to identify and treat the initially unknown disease. The controlled simulation model of assessment allows identification of patterns of performance that might suggest specific associations among facts in examinees' schema, or show the use of effective or ineffective problem-solving strategies.

Response format. Traditional simulations or similar assessments in education and industry, like those of complex cognition, generally rely on scoring or rating open-ended responses or protocols. Consequently, such assessments suffer from several methodological problems related to such scoring. Subjective evaluations are costly, time consuming, and subject to the effects of rater error. Although it is common practice to reduce error by training judges and providing illustrations of good and poor performance, judges do not always follow these rules and their evaluations may be influenced by a host of situational factors, such as stereotypic assumptions about the nature of acceptable performance. While judges may agree, this agreement may not reflect the targeted skills, especially when exercises have not been carefully designed to call forth these skills. Even in cases where the scoring of open-ended responses does not require judges, the procedures required for scoring and entering these data are labor intensive. This is true even when researchers are careful to structure and objectively analyze written or verbal protocols.

Problems associated with subjective scoring are exacerbated by task complexity. Not only does complexity make assessment expensive and scoring more difficult, but also it makes it difficult to obtain an adequate sampling of skill expression. Often, only a few exercises comprise any given session, of which only one or two may be targeted on specific skills. Such assessments are thought to yield performance scores reflecting exercise methods rather than the skill of concern, behaving like a traditional test comprising only one or two items. To complicate matters further, many exercises are interactive and occur in poorly-controlled settings. Thus, it is difficult to know how much of an individual's score reflects aspects of the assessment setting versus the individual's actual skill.

Traditional multiple choice formats, however, do not represent a useful alternative. First, even if responses to traditional 5-point multiple choice items required the application of the same processes as real-world tasks, such assessment would be less efficient than more integrated, complex responses. Second, traditional multiple choice items may actually elicit processes different from those required for doing real-world tasks. Using a criterion-related validity approach with such measures might lead to the identification of people who might be good at recognizing isolated facts. However, they may be poor at integrating the knowledge, skill, and strategies needed for complex tasks. Finally, multiple choice items simply look different from real-world tasks and are thus easily characterized as irrelevant and trivial, a face-validity consideration of particular import with executives. Given problems inherent in both traditional open-ended and multiple choice closed assessment formats, an alternative approach is used.

In assessment, the nature of the responses elicited should represent a performance; specifically, a performance that reflects application of the targeted skill. In assessment of high-level skills, researchers typically structure the task so that key components of task performance are elicited. Thus, for writing, one component of writing skills—revision—might be assessed by asking people how they would revise an essay. Another component of writing skill—planning might be assessed by asking people to outline an essay. As with classic, fixed-format methods, responses to these tasks are designed to elicit or reflect the use of attributes comprising the key components of the skill. Different attributes or characteristics of skilled performance are manifested in the resulting responses.

The MLE solution to the problems inherent in traditional fixed-format methods was to develop fixed response options for the tasks that represent qualitatively different expressions of the targeted skill. In responding to each prompt, examinees could select more than one response from several (apparently) equally attractive alternatives. An analysis of the responses would then be used to generate a profile of scores for each examinee based on the content of their most frequently selected items. Clearly, the nature of the response options is critical to the success of this strategy. The content of the response options must reflect important qualitative differences in the way people might complete the task. From these, inferences may be made regarding the processes being applied in task performance, and scores may be related to other indices of learning, development, and achievement.

The MLE strategy for development of the response options was to link them to a set of constructs or responses reflecting strategic differences in the application of domain knowledge and skills. As is discussed later, these linkages were made by developing response options in a series of focus groups consisting of subject matter experts. Systematic preferences in selecting responses were then held to reflect strategic differences in task performance. The critical evaluation and selection of equally plausible responses represent complex responding. The design of tasks to capture complex responses should be the real focus of assessment.

Further, related approaches to structuring response options have proven successful. When combined with convergent and divergent evidence from time-on-task and control measures, this measurement strategy provides a sound basis for inferring the application of the targeted metacognitive skill. Furthermore, this strategy provides a solution to important issues of practicality and cost of administration and scoring.

Linking fixed-response options to performance-relevant constructs represents a viable approach to construct measurement. When combined with the MLE strategy of allowing the selection of more than one response, the approach would conform to an important requirement of the assessment of complex skills: People should not be constrained to provide responses in which there is only one right, or wrong answer. The responses elicited, furthermore, reflect different strategies or approaches that can be used to perform a task, and could be linked to observable skills. Like traditional assessment exercises, the MLE elicits complex responses, providing a potentially more comprehensive description of the individual's performance capabilities.

The specified MLE assessment design considerations serve to structure the observations available from each task. Specific design features incorporated into the MLE assessments include high complexity, domain specificity, a low level of fidelity, and the use of construct-based, fixed response formats. Some or all these design features are characteristic of current measures of high-level cognitive skills. Thus, the MLE measures incorporate features that allow defensible inferences to be made about the nature of the targeted metacognitive skills.

DETAILED DESCRIPTION OF PREFERRED EMBODIMENTS

MLE Task Performance Model

Figure 1:
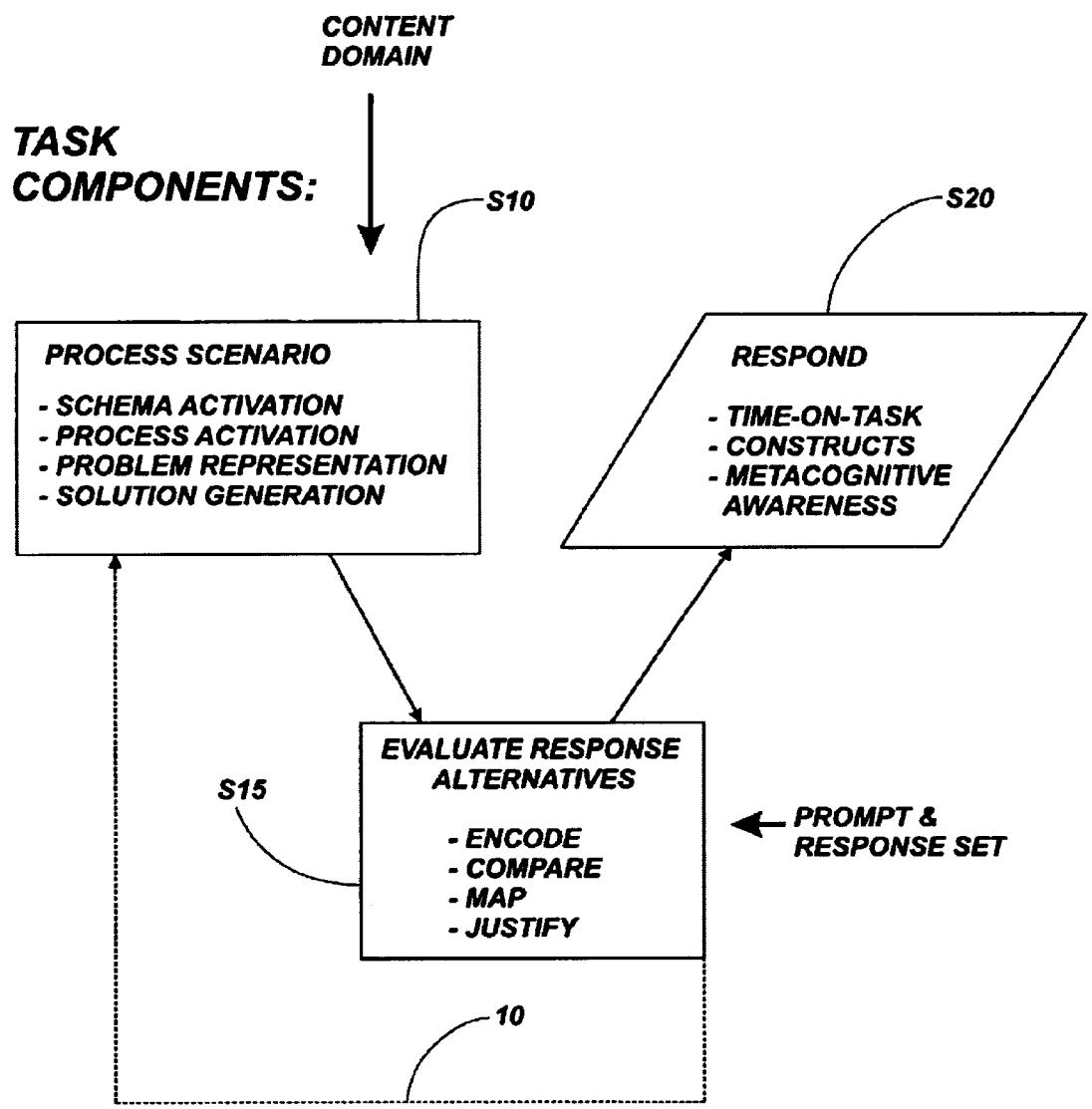
FIG. 1 schematically describes the general MLE task performance model.

The general MLE task performance model, illustrated in FIG. 1, has characteristics of cognitive process models in that it specifies a series of iterative operations, or exercise components (i.e., blocks and feedback loops) and a set of variables (experimental factors) held to influence the nature of the expression of the component operations. It is different from cognitive process models in its simplicity, level of generality, and the labeling of components as "task" rather than as "process" components. Thus, this model integrates human performance and cognitive process models, and is consistent with earlier observations concerning the nature of complex metacognitive skills. It summarizes our understanding of how people apply metacognitive skills to complex problems in real-world settings, and specifies how tasks might be decomposed into distinct components and sub-components.

Each exercise begins, at step S10, by presenting a test subject with a scenario, that is, a domain-specific controlled simulation task which the subject processes. This scenario is intended to activate relevant schema and problem solving processes, resulting in the construction of a mental representation of the problem and a set of alternative solutions. Schema activation makes available prior knowledge based on task content. The problem solving processes involved are those six convergent and divergent operations comprising the problem solving model (problem construction, information encoding, category reconceptualization, evaluation, implementation, monitoring). These processes operate on components of the activated schema (knowledge), yielding a mental representation of the problem and a set of potential solutions. The iterative nature of these operations is represented by the iterative feedback loop 10.

A given scenario, moreover, may be decomposed into two or more parts based on content. For example, people may first be presented with a statement containing background information about the problem. Next, relevant factual information may be presented, followed by goals and restrictions constraining the nature of possible solutions. By decomposing scenarios based on content, differences in the way people attend to different kinds of information may be assessed. Attention to different kinds of information might be measured by indices of the relative amount of time spent reviewing panels comprising information of a specific type. This approach could make it possible to relate patterns of these differences to other control and performance indices. For example, for some people, low scores on a task may be related to neglecting information related to restrictions; for others, low scores on a task may be related to neglecting the nature of the mission.

Response Alternatives

At step S15, having activated relevant schema and problem solving processes, a series of prompts with accompanying response options are presented which the test subject evaluates. "Prompts" means the question or statements accompanying each set of response options. These prompts define the bases for choosing particular options over others. The response options are designed to reflect constructs influencing the application of the targeted metacognitive skill. Responding to these prompts and response options is assumed to initiate encoding, feature comparison, mapping choice justification processes. Encoding operations involve noting salient characteristics, or features, of the response options, given the nature of the representation of the problem. Feature comparison operations involve comparing and evaluating features of the various response options to each other. Mapping operations fit features of specific response options to critical, solution-relevant aspects of the problem representation. Finally, people justify selected responses before responding. As with decomposed scenarios, patterns of responses to these prompts and response option sets may be related to control and performance indices. In addition, scores based on responses to the prompts may be related to patterns of responses to the decomposed scenarios, allowing assessment of scenario-by-response-set interaction effects.

At step S20, the test subject responds. Conditions of test administration and responses received therefrom are a critical aspect of assessment design. In the MLE, computer administration provides several benefits. First, it allows time-on-task measures to be captured. Since the components and sub-components of the tasks are related to specific content and constructs, recording the relative time spent actively engaged with certain task components may provide potentially useful measures of skill application process and strategies. These measures, captured passively, will strengthen the nomothetic span of the assessment battery.

Second, computer administration is less effortful from the perspective of examinees. Solving complex problems is inherently an effortful task, and the controlled simulation tasks may need to be varied. With computer administration, a task may be programmed in various ways to maintain the interest of examinees, without changing the substance or nature of the basic task structure. Third, computer administration may enhance the fidelity of the simulations. Examinees work through each task at their own pace and respond in ways tailored to the presentation of the task and the nature of each problem.

Finally, and what is most important, computer administration can allow immediate, on-line scoring and performance feedback. This feedback capability enhances the acceptance of the assessment process by examinees and yields more reliable data overall. Further, the database used by the scoring and feedback system for the assessments may be continually updated, allowing normative data to be passively collected over time.

Specification of the procedures for assigning values to the responses on the measures represents the measurement design of the assessment. The observational design previously described makes it possible to specify multiple objects of measurement. Observations are taken from the various components and sub-components of the tasks as described above. Specifically, these observations consist of time-on-task and scores based on specific constructs keyed to the response options. Wherever possible, the MLE was designed to provide multiple measures of metacognitive skill for each task component and task sub-component. From these observations, a comprehensive set of performance indices is derived, representing general metacognitive skill, strategic application of the skill, and the constructs contributing to skill level and its application.

The MLE measures are designed to be computer-administered. The MLE software design characteristics include the following:

Standard "look and feel". The exercises within the MLE have a standard "look and feel" typical of Microsoft Windows-based programs. Thus, the user interface is familiar to those who have used Windows-based programs and is easy to learn for those who are not familiar with this technology.

Randomization of measures, prompts, and response alternatives. The software allows the designer to specify whether the measures, prompts, and/or response alternatives are to be presented in a fixed or randomized order. This capability automatically controls for order effects in the presentation of measures, prompts, and/or responses. In the present study, all measures and response alternatives were randomized; and most prompts within the exercises were presented in a fixed or logical order.

Accurate stimulus presentation and response recording. Since the software controls the order in which the measures, prompts, and alternatives are presented, it is possible to ensure the standardized and accurate presentation of stimuli across all participants.

Verification of participant's responses. As the participants enter their responses, the software checks to see that the correct number and types of responses were made. For example, if the participant attempts to move to the next prompt before answering the current prompt or selects too few or too many responses, the software forces him/her to correct the response before continuing. In this way, complete and accurate data are recorded.

On-line data logging and scoring. As participants work through the various exercises, their responses are automatically recorded and scored. In future versions of the software, this feature will make it possible to provide immediate feedback to the participants on their performance.

Security and administrative control. Special software features record the participant's identification number and use this number to ensure that the participants complete the exercises only once. These features also allow the participant to pause during the exercises, entering a security code and later using this security code to return to complete the exercises after their pause.

The MLE software is composed of three modules: (1) the Instructions Module; (2) the MLE Exercises; and (3) the Authoring System.

Instructions Module. The Instructions Module introduces participants to the MLE, describing the various presentation styles or modes and the ways in which the participants will respond to the exercises. This module is automatically installed with the MLE and takes about 15 minutes to complete.

MLE Exercises. The MLE exercises are designed to administer the measures, record the participant's responses, and to provide on-line scoring. The MLE Exercises are automatically installed and take approximately 2 to 2½ hours to complete.

MLE Authoring System. The MLE exercises are reconfigurable (within the capabilities of the presentation response modes currently supported) via a designer defined ASCII script file. The script defines specific prompts and choices, and selects the appropriate presentation format. Response data are then captured based on the type of presentation format selected. Among the response formats available for use are the following:

Initial Prompt Response Types

Likert-type rating scale: Pick one on the 5-point rating scale.

Multiple choice: Pick at least X of Y choices

Multiple choice: Pick at most X of Y choices

Multiple choice: Pick from X to Y of Z choices

Reorder previously made choices

Rate paired comparisons on a 4-point Likert-type scale.

Retention of Choices for Future Prompt Responses

Retain all previous choice alternatives

Retain selected choices

Retain all choices alternatives plus selected choices

The MLE can be administered on a standard software platform. This platform consists of the following:

IBM-compatible computer (386 or higher processor)

4 MB of RAM 2.5 MB available hard disk space

Microsoft Windows 3.0 or higher 3.5 high-density disk drive

VGA or higher resolution monitor

Microsoft-compatible mouse or track ball

MLE Install disk with Instructions Module and MLE Executable.

Installation and execution of the Instruction Module and the MLE Exercises is straightforward and requires minimal computer knowledge. As participants complete the MLE, a log file is saved onto the hard drive. Upon completion of the MLE or exiting before completion, the log file is saved back to the data disk, in a flat ASCII text file, which may be imported into any database or spreadsheet which respects space-delimited text files.

Adaptation and Refinement of MLE Measures

The invention of the MLE provides measures which assess the cognitive and metacognitive skills of executive trainees, applicants for executive positions or candidates for higher level management positions. The invention includes engineering of "script based" tests. This allows for new scripts designed for different knowledge domains (i.e., military, manufacturing, finance, business management, advertising, marketing research and development . . . ). While monitoring key metacognitive construct predictors, experienced leaders are utilized to provide subject matter expertise in the development and refinement of these script based measures to ensure their appropriateness for the targeted managerial population. These subject matter experts (SMEs) also ensure that the measures tap tactical-level decision-making as well as strategic decision-making.

A major accomplishment of the invention is to refine the MLE measures, as necessary, so that they were appropriate to a high-level population. In particular, it was necessary to refine the MLE measures to be consistent with the focus on strategic leadership and decision-making. Thus, the existing MLE measures were refined to ensure that the content and scoring keys were appropriate for use with a wide variety of managerial populations. The steps to be carried out in the refinement of the MLE measures are described below.

A selection is made of SMEs knowledgeable of the strategic decision-making skills required by their industry or organizational requirement. These SMEs are briefed on the design protocols used to develop the measures including the development of the scenarios, the prompts which elicit the metacognitive skills, and the development and scoring of response alternatives. Then, the SMEs review the measures including the scenarios, prompts, responses, and response keys to determine how to adapt the measures to be appropriate for their candidates. In particular, they examined the extent to which the measures elicit strategic, rather than tactical, decision-making skills.

Where appropriate, the SMEs assist in the revision of the scenarios, prompts, and responses to make them more appropriate to organizational requirements. For two of the six measures, the SMEs follow the measure design protocols in order to develop replacement scripts. In particular, the SMEs ensure that:

The terminology is accurate and appropriate for their candidates;

The scenarios are clear, concise, understandable, and plausible;

All questions, and responses are plausible; and

The plausible responses range from effective to ineffective.

Once the measures are revised and refined, three SMEs independently rate the responses to each prompt in terms of its effectiveness in answering the question within the given scenario. Scoring keys are developed using the mean SMEs effectiveness ratings.

Specific design features and content of the six MLE metacognitive skills measures are described. These descriptions include problem scenarios, examples of prompts, and scoring procedures. The metacognitive measures are discussed in the following order:

General Problem Solving,

Planning and Implementation,

Solution Construction,

Solution Evaluation,

Social Judgment, and

Metacognitive Process.

General Problem Solving Measure

Metacognitive processes comprise critical components of a general capacity to solve complex problems. The metacognitive General Problem Solving exercise reflects the operation of eight underlying divergent and convergent problem solving processes which have been included as critical operations affecting creativity and problem solving in most important models of problem solving and recent theories of intelligence. Because leadership represents complex problem solving in ill-defined social domains, leader problem solving reflects the operation of the processes described below.

Figure 2A:
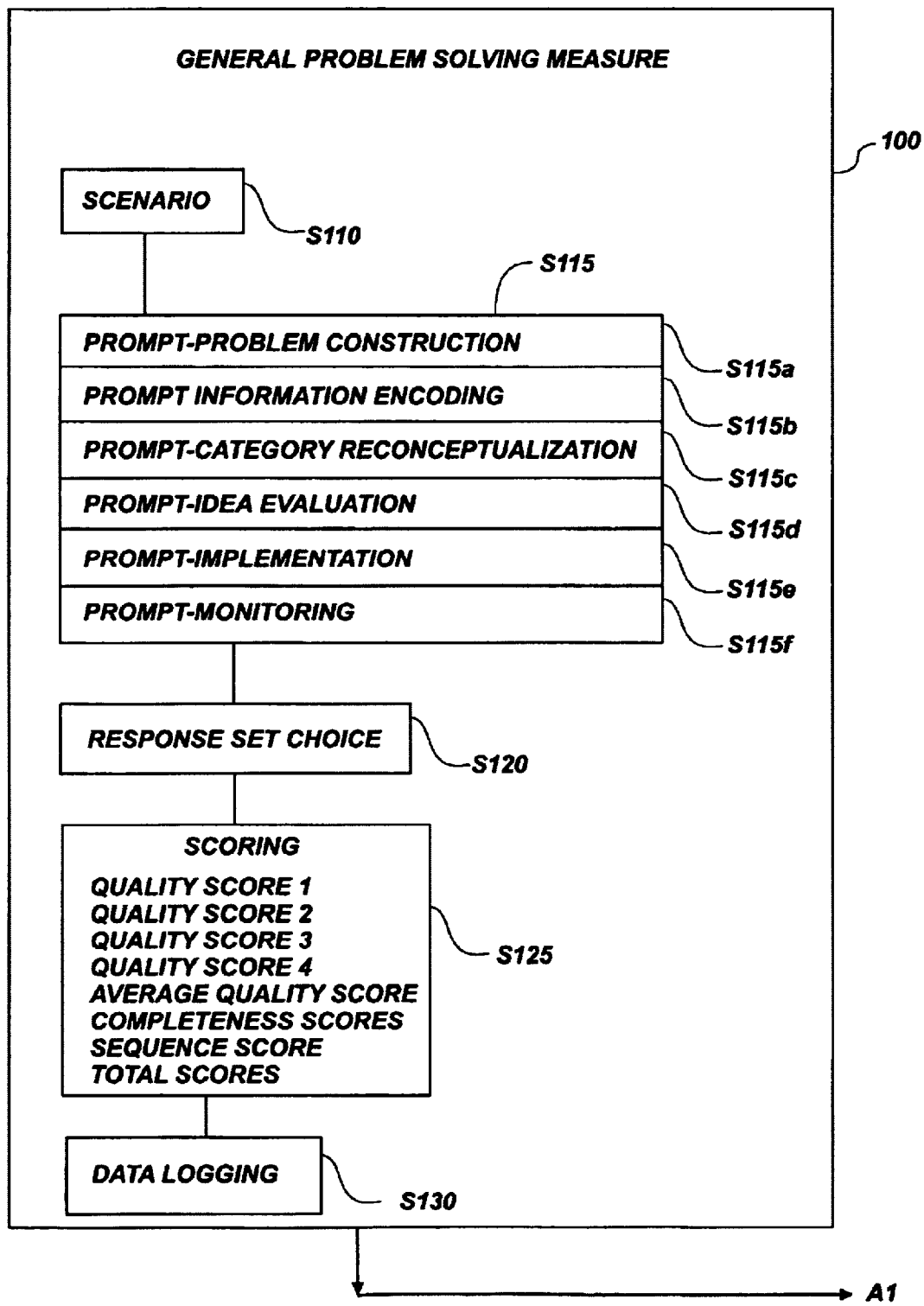
FIGS. 2a and b show a flow chart of the MLE Assessment Methodology.
Figure 2A:
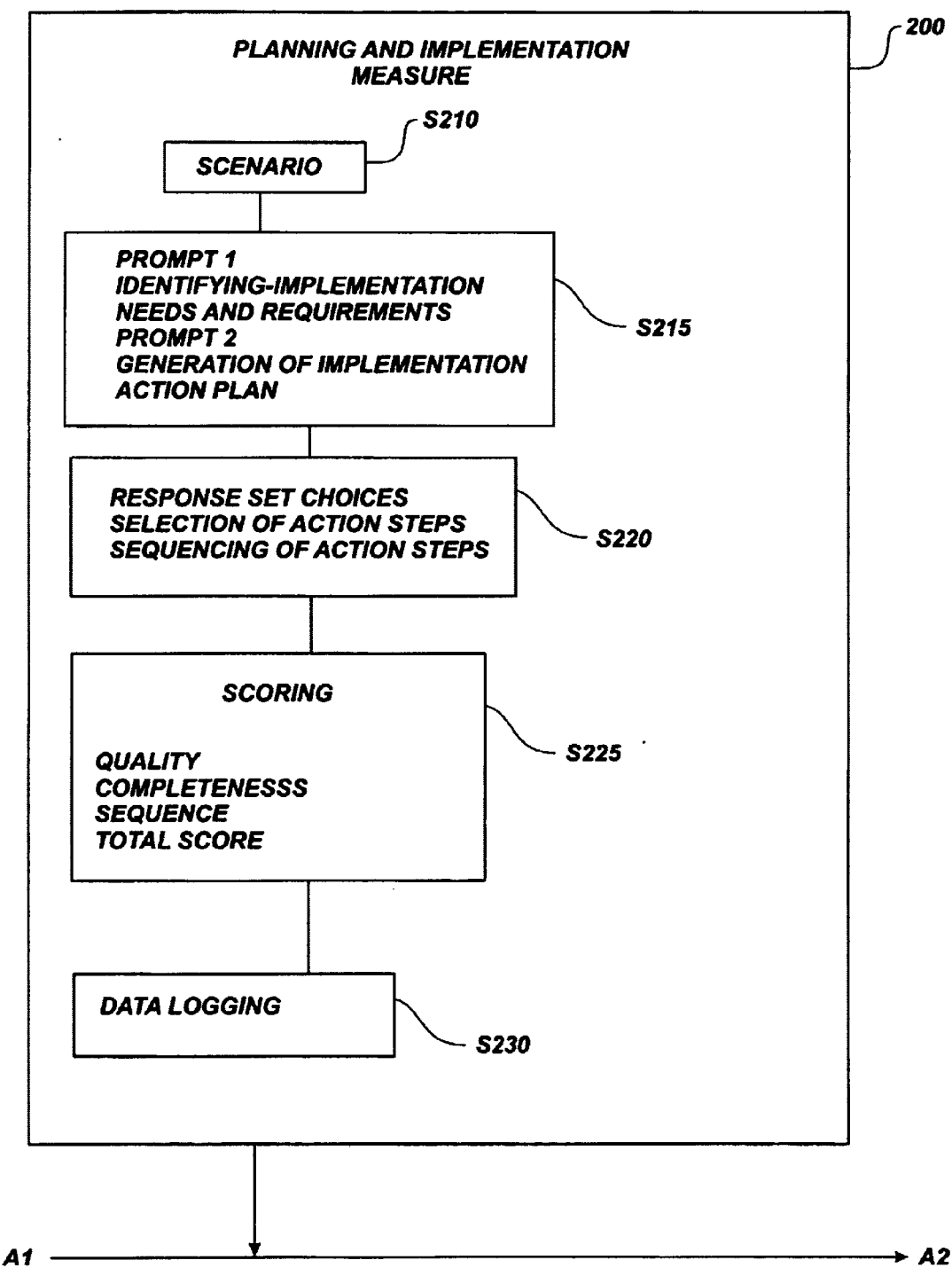
Figure 2A:
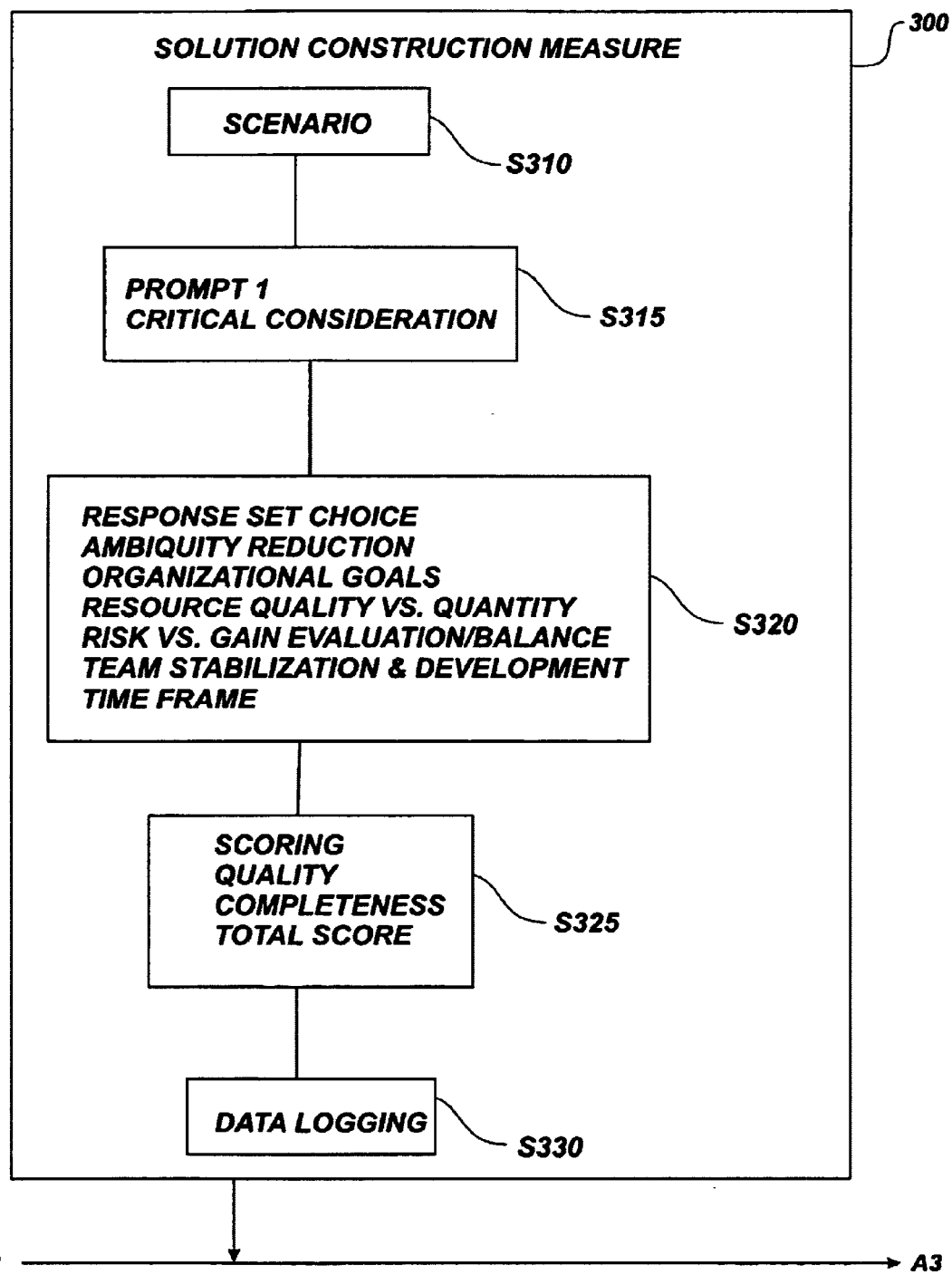
Figure 2B:
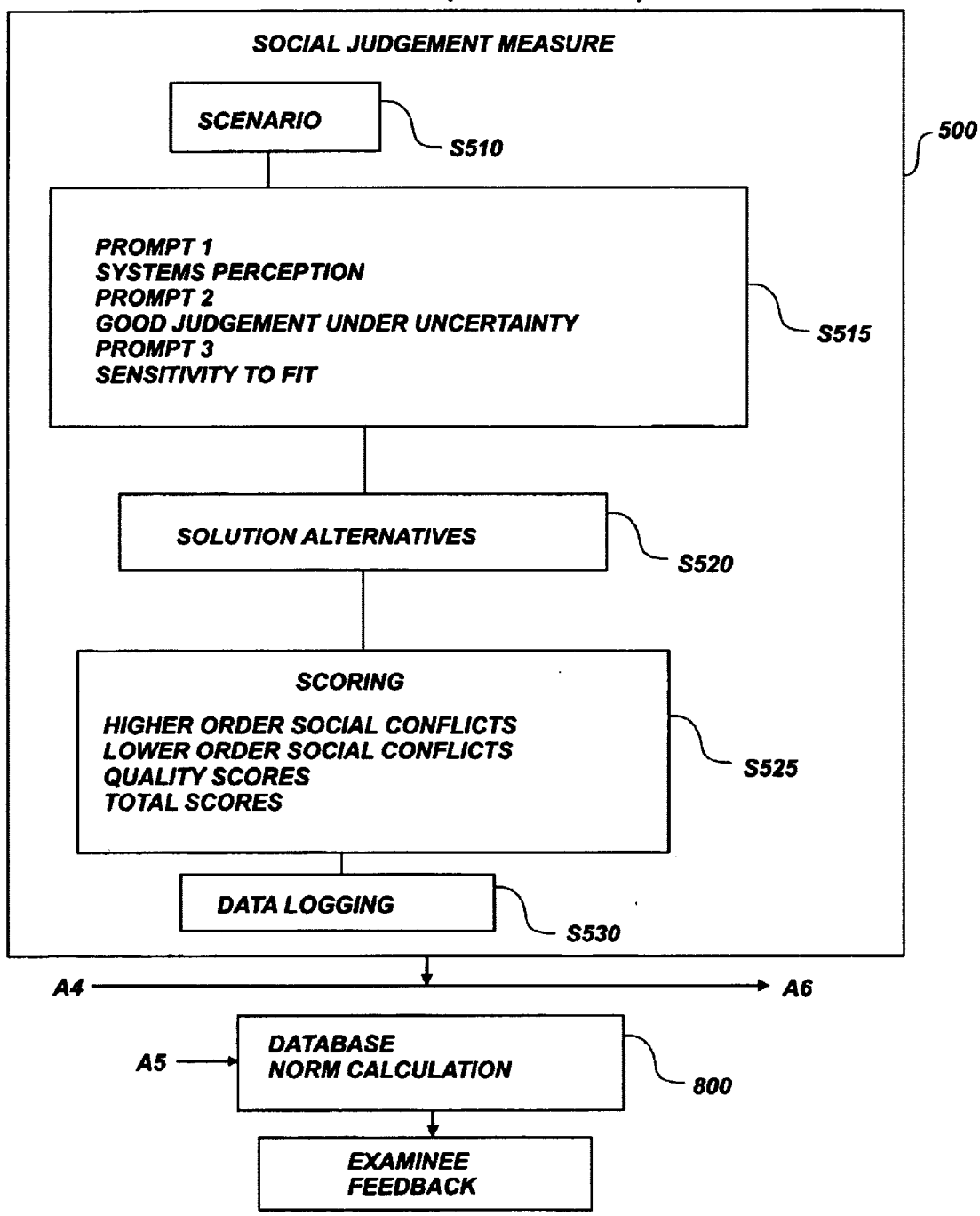

Exercise description. Referring to FIG. 2A, the metacognitive General Problem Solving exercise 100 begins at step S110, by presenting and having participants assume the role of a manager in a novel, ill-defined problem scenario. This scenario is similar to those found in standard controlled simulation exercises. Because the exercise is ill-defined, it requires the application of the metacognitive processing skills. Ill-defined, complex tasks require the application of conscious, slow process metacognitive skills The exercise is face- and content-valid with respect to the competitive domain. The problem scenario is structured to include the following information:

Problem description, including goals and objectives;

Resources available, including personnel and equipment;

Logistics issues, including environmental conditions; and

Current status, as reflected by information describing the status of your organization and the competition.

First, the problem scenario establishes the executive's basic assignment. As the scenario unfolds, the executive is faced with several problems and is tasked with deciding an appropriate course of action. The scenario outlines several strengths and weaknesses of the personnel, logistics, and the nature of the surrounding environment.

Prompts and response alternatives. Next, at step S115, participants are presented with a series of six prompts or questions designed to activate the metacognitive problem solving component processes described above. These prompts are presented in a sequence that reflects how the metacognitive skills might be applied in a real-world problem solving effort. At step S120, in five of the six prompts, the participant is asked to select at least three and no more than eight response alternatives; in one question, the participant is asked to rank order a list of responses to a prior question in terms of their importance or criticality in solving the problem. In Table 1, the prompts are accompanied by the name of the metacognitive skill it is intended to elicit.

TABLE 1

PROMPTS AND RELATED METACOGNITIVE SKILL

| Skill | Constructs Prompt |
|---|---|
| 1. What are the key problems? | Problem Construction |
| 2. What information would you need before deciding what to do? | Encoding Information |
| 3. Reorder or prioritize the information you previously selected so #1 is the MOST CRITICAL to solving the problem, #2 is the second most critical, etc. | Reconceptualization |
| 4. What was the plan of action that you decided upon? | Idea evaluation |
| 5. How will you see your plan carried out? | Implementation |

Constructs influencing skill application. The processing skill-related constructs that represent the eight core problem solving processes are defined in terms of how they contribute to general problem solving. Three of these eight skills (category search, specification of best fitting categories, and category combination and reorganization) have been combined to form a general process skill of category reconceptualization.

Problem construction. At step S115a, the method provides for prompting in a manner to initiate problem construction. Problem construction refers to applying processes used to identify, define and construct elements and parameters of problems. When leaders are faced with novel or ill-structured problems, problem construction processes are likely to make a greater contribution to problem solving.

Information encoding. At step S115b, the method provides for prompting to initiate information encoding. Information encoding refers to finding information necessary to begin to develop problem solutions. Information encoding influences problem solving by limiting the quantity and quality of information available for subsequent information search and manipulation operations comprising category reconceptualization.

Category reconceptualization. At step S115c, the method provides for prompting to initiate category reconceptualization. Category reconceptualization refers to specifying and manipulating relevant information acquired during information encoding to fit the nature of the problem. Category reconceptualization (subsuming category search, category specification, and category combination operation) contributes to problem solving by generating the new understandings that might be required for developing solutions to novel, ill-defined problems. A potential problem solution is the result of this operation.

Idea evaluation. At step S115d, the method provides for prompting to initiate idea evaluation. Idea evaluation refers to critical review of potential problem solution with respect to criteria such as potential utility, practicality, and appropriateness, given the nature of the problem Idea evaluation influences general problem solving by performing a critical "quality control" function in the problem solving process.

Implementation. At step S115e, the method provides for prompting to initiate implementation. Implementation refers to the operationalization of the problem solution and involves such activities as selecting, ordering, and prioritizing the actions required by the problem solution. For leaders, this involves planning, resource allocation, response sequencing, and the marshaling of social support in carrying out problem solutions. Solution implementation skills influence general problem solving by determining how well optimized the solution is operationalized.

Monitoring. At step S115l, the method provides for prompting to initiate monitoring. Monitoring refers to evaluating the progress of the activities laid out in the solution implementation operations and requires that leaders recognize errors and adapt to changing circumstances. Monitoring influences general problem solving by determining the timing and sequence of solution implementation, the social dynamics of the implementation, and degree of adaptation within the environment. Monitoring may lead ultimately to the leader recognizing the need to redefine the nature of the problem be or she is confronting via the problem construction process.

The alternative responses to these prompts have been designed such that participants high in metacognitive skill are expected to respond differently from those low in metacognitive skill. Approximately half of the responses to each question reflect a high level and approximately half reflect a low level of application of the targeted skill.

As is the case with all of the MLE measures, specific characteristics of this exercise reinforce its characterization as invoking metacognitive skills. These characteristics reflect the design considerations described above:

- The ill-defined, complex nature of the exercise invokes slow process, metacognitive skills. It is domain-specific.
- The nature of the prompting questions explicitly requires engagement of specific active processes, such as constructing an understanding of the nature of the problem and evaluating a potential solution.
- The pool of alternative responses to the skill-prompting questions is linked to domain specific general expertise and specific problem parameters.
- An analysis of leader characteristics represented in the sample assured that selected responses represent a wide range of possible specific response styles and content.
- The responses do not simply reflect general cognitive ability. Ratings by experts and industrial/organizational psychology doctoral students provide supporting evidence that the response alternatives are plausible and reflect different levels of the targeted skill.

Scoring. At step S125, the development process for obtaining the response alternatives strengthens the inference that differences in response patterns reflect high and low metacognitive skill. Specifically, the alternative responses reflect differences in the level of application of the skills/constructs activated by the prompts. The scores derived from responses to these prompts are described in Table 2.

TABLE 2

SCORES OBTAINED FROM THE GENERAL PROBLEM SOLVING MEASURE

Construct Quality Scores: Separate construct scores are derived for each of the six prompts. Two different types of construct scores, Quality and Sequence, are derived, depending on the format of the prompt.
Quality: Based on the proportion of available responses and the number that the participant picked from among those which reflect high and high plus medium levels of skill, Construct Selection Quality Scores are calculated and averaged for the following five constructs:
Problem Construction (Prompt #1),
Information Encoding (Prompt #2),
Idea Evaluation (Prompt #4),
Implementation (Prompt #5), and
Monitoring (Prompt #6).
Sequence: Prompt #3, measuring Category Reconceptualization, generates a different type of quality score, referred to as the Sequence Score. This score is defined as a proportion, where the numerator reflects the actual "correctness" of the sequencing of the alternatives in terms of their TABLE 2-continued

SCORES OBTAINED FROM THE GENERAL PROBLEM SOLVING MEASURE criticality (as predetermined by experts) the denominator reflects the maximum possible "correctness" score given the choices selected in the previous question.
Total Score: The overall score for General Problem Solving is twice the Quality Score plus the Sequence score.

Finally, at step S130, the method provides for logging data associated with the test for future analysis.

Planning and Implementation Measure

Metacognitive planning and implementation skills refer to the selection, ordering, and prioritizing of strategic processes resulting in problem resolution. The Planning and Implementation measure 200 involves decision making concerning how, when, and where strategic processes are applied. When leaders face such complex, ill-defined problems, their planning and implementation skills become critically instrumental in developing effective and adaptive solutions.

Planning and implementation skills are critical to leader performance. Planning and implementation skills fall under the superordinate dimension, "information use in problem solving." Leaders use their planning and implementation skills to facilitate interpersonal coordination across and within multiple teams. Planning and implementation skills allow for the consideration, selection, and application of situationally appropriate responses within complex and dynamic social domains.

Exercise description. At step S210, the exercise begins by asking participants to assume the role of a manager in a novel, ill-defined problem scenario. The exercise is face- and content valid with respect to the domain. Because the scenario requires participants to develop a plan and to sequence the action steps of the plan, the scenario requires the application of metacognitive planning and implementation skills.

Prompts and response alternatives. At step S215, after reading the problem scenario, the participants review a randomized list of relevant action steps that may be used to construct a plan. The following prompt accompanies the action steps comprising the response options:

Given the above scenario, select statements from those listed below to create an overall action plan to solve this problem. Select AT LEAST 8 specific actions.

At step S220, after making their selections, the participants are prompted to put the action steps in an appropriate sequence:

Here are the actions you selected. Now, organize them into the MOST EFFECTIVE SEQUENCE for them to be carried out.

As with the General Problem Solving Measure, the process of deriving these response alternatives supports the inferences that differences in responding reflect high, medium and low metacognitive planning and implementation skill. The action steps were reliably classified as one of three functional categories, only the first two of which are shown, respectively, at steps S215a and S215b:

Identifying implementation needs and requirements. Action steps concerned with identifying significant factors or constraints that influence the implementation of the problem solution.

Generation of implementation action plan. Action steps concerned with conceiving ways to accomplish jobs, goals, and missions with available resources and to solve problems with respect to identifying needs and requirements.

Coordination and communication of action plan. Action steps concerned with informing others of plans and activities and becoming knowledgeable about what others are doing or planning to do; confirming what assistance others can and will provide; and Delegating responsibility for implementation of action plan to subordinates via written or oral communication. The pool of action steps from which participants select contains approximately equal numbers of action steps representing each of these three functional categories.

Scoring. At step S225, the participants' selections are used to derive the scores described in Table 3.

TABLE 3

SCORES OBTAINED FROM THE PLANNING AND IMPLEMENTATION MEASURE

Construct Quality Scores: Two PLANNING construct quality scores are derived from responses to the first prompt.
Quality: Based on the proportion of available responses and the number that they picked from among those which reflect high and high plus medium levels of skill, Construct Selection Scores are calculated for Planning (prompt #I).
Completeness: This is the extent to which participants' selections represent the percentage of functional categories (i.e., identifying needs and requirements, generating action plans, and coordinating and communicating action plans) covered by the participant's selections to prompt #1.
One IMPLEMENTATION construct score is derived from responses to the second prompt. Sequence: This score is a proportion, where the numerator reflects the actual "correctness" of the sequencing of the various action steps (as defined by the three functional categories: identifying implementation needs and requirements, generation of implementation action plan, and coordination and communication of the action plan) and the denominator reflects the maximum possible "correctness" score given the choices selected in the previous question.
Total Score: The overall Planning & Implementation score is equal to twice the Quality Score plus the Completeness and Sequence Scores.

Finally, at step S230, the method provides for logging data associated with the test for future analysis.

Solution Construction Measure

Solution construction skills rely in part on the problem solvers ability to select relevant information in seeking to understand the boundaries of problems and the characteristics of likely solutions. Examples of solution characteristics include attention to restrictions, team stabilization and development, emphasis on organizational goals, and the reduction of ambiguity in the problem domain. When faced with complex, ill-defined problems, effective leaders are likely to possess the metacognitive skill and expertise required to identify the key constraints and parameters in situations that define the likely solution characteristics. These skills complement the response generation capacities of problem construction, information encoding, and category search, specification, and recombination.

Solution component content categories. Six categories representing critical considerations, or criteria identified as relevant to the scenario are represented by problem and information statements in the exercise. These content categories were drawn from a taxonomy developed from a review of the literature that identified potential solution component content categories. These content areas are as follows:

Ambiguity reduction. The extent to which the leader prefers problem solutions that focus on information related to restrictions present in the problem.

Organizational goals. The extent to which the leader prefers problem solutions that emphasize broader organizational goals, allowing for multiple constituencies; and the extent to which the leader is concerned with the goals and intentions of other entities outside the organization.

Resource quality versus quantity. The extent to which the leader prefers problem solutions that emphasize concerns for the amount and nature of available resources that may be used. For example, is there a "right" combination and number of role incumbents to carry out a solution plan?

Risk versus gain evaluation/balance. The extent to which the leader prefers problem solutions that emphasize a concern for the potential dangers and benefits and related tradeoffs.

Team stabilization and development. The extent to which the leader prefers problem solutions that emphasize concern for the satisfaction and functioning of the team. Does the leader try to develop the team and the individual?

Time frame. The extent to which the leader prefers problem solutions that emphasize concerns for the time span of the goals suggested by the problem Is the leader able to determine (or at least be concerned with) the appropriate time line of the proposed solution? Is there sufficient time to plan and implement the solution?

The responses to the prompt include two statements for each of the six component content categories. Of these two statements, one reflects a high level and the other reflects a low level of solution construction skill as determined by experts. Also, all responses were rated by experts as plausible.

Exercise description. The solution construction measure exercise 300 begins at step S310 by presenting a problem scenario in which the participant is asked to assume a role. Faced with an ill-defined problem in the scenario, the role player is required to develop an appropriate plan. The content of the exercise allows for the application of problem definition skills.

Prompts and response alternatives. At step S315, after reading the problem scenario, participants are presented with the following prompt:

If you were faced with this situation, what are the problems you would be concerned with?

The prompt is accompanied by two randomized problem statements for each of the six component content categories: one reflecting a high level and one reflecting a low level of solution construction skill. Each of the problem statements have been rated by experts as being plausible and on their level of effectiveness in answering the prompt. Following the prompt, at step S320, participants select a minimum of three to a maximum of eight alternatives.

Scoring. At step S325, the choices made in response to the prompting question form the basis for generating the scores described in Table 4.

TABLE 4

SCORES OBTAINED FROM THE SOLUTION CONSTRUCTION MEASURE

Construct Quality Scores: Two Solution Construction construct scores are derived from responses to the prompt.
Quality: Based on the proportion of available responses and the number that they picked from among those which reflect high and high plus

TABLE 4-continued

SCORES OBTAINED FROM THE SOLUTION CONSTRUCTION MEASURE medium levels of skill, Quality Scores are calculated.
Completeness: This is the percentage of the six component content categories (i.e., Ambiguity Reduction, Organizational Goals, Quality versus Quantity, Risk versus Gain Evaluation/Balance, Team Stabilization and Development, and Time Frame) covered by the participant's selections.
Total Score: The overall Solution Construction score is equal to twice the Quality Score plus the Completeness score.

At step S330, the method provides for logging data associated with the test for future analysis.

Solution Evaluation Measure

When confronted with complex, ill-defined problems, effective problem solvers use convergent thinking processes to evaluate the viability and appropriateness of solutions compared with other solution candidates. This evaluation process requires an identification for each solution of key logistical and social considerations, and the solution costs in terms of resources and social demands. Metacognitive solution evaluation skill represents the capacity to evaluate the viability and appropriateness of specific solutions from several alternative solutions. Metacognitive solution evaluation skill allows leaders to identify solutions that represent a "best fit" to problem parameters. Additionally, good solution evaluation skills allow leaders to assess solution viability with respect to constraints and other mitigating factors that might affect the solution's implementation. These skills complement the idea evaluation metacognitive skill.

Dimensions of skill application. Two criteria that leaders use when evaluating solutions are defined below. These criteria were drawn from a review of the decision-making literature.

Appropriateness. Given the problem situation, how well does the proposed solution address the breadth of specified problems? Solutions which attend to all social and logistical considerations inherent to the problem are considered appropriate to the solution of the problem Solutions which do not attend to social and logistical issues are considered inappropriate for the problem's solution.

Breadth of coverage. Does the proposed solution include actions or considerations which are relevant and necessary to the solution of the problem? Solutions that address critical aspects of the problem and represent feasible means for implementation are considered highly viable. Solutions that are impractical, or contain actions or considerations that do not help the leader address the concerns inherent in the problem are considered low in breadth of coverage.

Exercise description. The solution evaluation measure exercise 400 begins at step S410 by presenting a scenario in which participants are asked to assume the role of a manager faced with an business emergency. The scenario presents relevant background information, goals and objectives, resources and constraints, and situation status. Then, the problem scenario allows for the presentation and evaluation of alternative solutions.

Prompts and response alternatives. At step S415, after reading the problem scenario, participants are presented with a randomized set of every possible pair (i.e., six) of four potential solutions, The following prompt asks participants to compare randomized pairs of solutions:

Which of these two is the better solution to the problem?

At step S420, these comparisons are made by selecting one of the following:

A is Much Better A is a Little Better B is Much Better B is a Little Better

These responses provide the basis for finding out an individual's evaluation, in terms of their rank order, of the relative quality of the four problem solutions.

Alternative solution development. The appropriateness of solutions is manipulated by varying solution content. Due to the team-based nature of the scenario used in this measure, the content of solutions reflect varying degrees of key team considerations. These team considerations were obtained from a review of the team performance literature, which yielded a comprehensive list of internal and external team variables that influence coordination of team members in successful collective action. As illustrated in Table 5, these variables were subsequently classified into the overarching categories of logistical and social considerations. Highly appropriate solution statements address both social and logistical considerations, while solutions low in appropriateness address only logistical considerations.

TABLE 5

CLASSIFICATION AND DEFINITION OF KEY TEAM PERFORMANCE CONSIDERATIONS

| Logistical Considerations | Social Considerations |
|---|---|
| Subordinate Resources | Communication Structure |
| Role Assignment | Cohesion/Morale |
|  | Task cohesion |
| Performance Protocol | Social cohesion |
| Goals | Morale |
| Feedback/monitoring | Collective efficacy |

The appropriateness and viability of each solution was manipulated by varying its content and reflecting decision rules and strategies derived from decision making models. The four solutions, each varying on the constructs of appropriateness and viability, were rank ordered by experts in terms of their effectiveness in addressing the problem.

Scoring. At step S425, pair wise comparisons among the four solutions in response to the prompting question are used to generate the Solution Evaluation Quality Score described in Table 6.

TABLE 6

SCORE OBTAINED FOR THE SOLUTION EVALUATION MEASURE

Total Solution Evaluation Quality Score: This is a fixed score, derived from an average of the participant's individual ratings comparing the six pairs of solutions; where the participant's ranking of each solution pair is evaluated in terms of the direction and distance of the ranking compared to the direction and distance of the rankings of the solutions by experts.

Social Judgment Measure

Metacognitive social judgment skill represents the capacity to understand and monitor social dynamics within a problem solving situation. Social judgment is a key leadership competency. To be effective problem solvers, leaders must have the sensitivity and understanding of other peoples' perspectives and goals and must be aware of their position in the political and social hierarchy. In so doing, they demonstrate the skills necessary to accurately evaluate and solve a complex problem situation in the social domain.

Constructs influencing skill application. Three specific constructs that contribute to effective social problem solving are, Systems Perception, Good Judgment Under Uncertainty, and Sensitivity to Fit. People having high levels of these characteristics are more likely to display effective social judgment skills. Here are definitions of these three constructs:

Systems perception. Systems perception refers to having a good understanding of others with respect to social systems, such as organizations and groups. It is the capacity to be aware of or sensitive to social needs, goals, demands, and problems at multiple system levels (i.e., at the group, organization, or broader environment levels). System perception also includes the capacity to be aware of system deterioration.

Good judgment under uncertainty. Good judgment under uncertainty refers to having the willingness and capacity to make sound decisions and act appropriately in ambiguous situations. People having good judgment under uncertainty recognize the limitations of knowledge and how these limitations influence problem solving.

Sensitivity to fit. Sensitivity to fit refers to knowing whether an answer, solution, or action will work in a given situation, beyond what would be expected from general cognitive ability alone.

Exercise description. The social judgment measure exercise 500 begins at step S510 by presenting a complex scenario in which negative outcomes occur because of an individual's failure to attend to complex, conflicting social cues. The content of the scenario was developed to require the application of social judgment and is structured as a critical incident. Thus, the scenario presents background information, a description of behavior in the situation, and the consequences of the behavior or response:

General background information. This information is important to understanding the problem in context.

Social conflict information. This information highlights the complexity and social dynamics of the situation. Social conflict information allows the individual to find out the level of analysis required to solve the problem and to identify key components of the problem.

Consequences. The consequences resulting from the problem are presented. This information is necessary for the problem solver to accurately evaluate the problem and its consequences.

Prompts and Response Alternatives. After reviewing the scenario at step S515, participants are presented with three questions intended to activate relevant social judgment skills. Each of these prompts is intended to reflect one of the constructs influencing effective application of social judgment skills: systems perception, good judgment under uncertainty, and sensitivity to fit. These prompts are presented in Table 8, with examples of how the definition of each construct may be manifested in specific response alternatives. The fixed sequence of the prompts represents how these questions might be raised and addressed in real-world problem solving.

At step S570, randomized responses accompany each of the three questions presented in Table 7. The responses: (1) have been rated in terms of their effectiveness by experts; (2) represent high and low quality social judgment skill; and (3) are linked to either systems perception, good judgment under uncertainty, or sensitivity to fit. Also, all responses have been determined to be plausible by experts.

TABLE 7

QUESTIONS INTENDED TO ACTIVATE SOCIAL JUDGMENT PROCESSING SKILLS

1. Why did this situation occur?
Targeted Construct: Systems Perception. Responses to this prompt reflect the nature and complexity of the social information attended to and focus on key information directly relevant to the problem Individuals with TABLE 7-continued

QUESTIONS INTENDED TO ACTIVATE SOCIAL JUDGMENT PROCESSING SKILLS higher levels of social judgment are more likely to relate problem components to higher order social conflicts among systems components. Individuals with lower levels of social judgment are more likely to relate problem components to more concrete aspects of the problem.
2. What was the central mistake made by the pharmacologist?
Targeted Construct: Good Judgment under Uncertainty. Responses to this prompt reflect the ability of the leader to make appropriate decisions in ambiguous situations. The nature of the response indicates the complexity of the individuals' problem representation. The responses are designed to reflect overall effectiveness in applying social judgment skill.

Scoring. At step S525, the three prompts ask participants to select a minimum of three and a maximum of eight of the response alternatives. These choices are used to derive the scores described in Table 8.

TABLE 8

SCORES OBTAINED FROM THE SOCIAL JUDGMENT MEASURE

Construct Quality Scores: Separate Social Judgment construct scores are derived for each of the three prompts.
Quality: Based on the proportion of available responses and the number that they picked from among those which reflect high and high plus medium levels of skill, Quality Scores are calculated and averaged for the following three constructs:
Systems Perception (Prompt #I),
Good Judgment Under Uncertainty (Prompt #2), and
Sensitivity to Fit (Prompt #3).
Total Score: The overall score for Social Judgment is the average of the three quality scores.

At step S530, the method provides for logging data associated with the test for future analysis.

Metacognitive Process Measure

This measure is intended to be an assessment of overall metacognitive process. That is, it assesses the awareness people have of their prior understandings, as suggested by their ability to reevaluate these understandings over time in the light of new information. The Metacognitive Process Measure goes beyond traditional approaches to the measurement of metacognitive skills. In contrast, the other five measures comprising this battery assess differences in how participants apply specific metacognitive skills. To the extent possible, this measure was designed to synergistically incorporate the most relevant and effective features of existing measures of metacognitive and high-level, conscious cognitive processes.

Exercise description. The metacognitive process measure exercise 600 begins at step S610 by presenting participants with an ambiguous problem scenario involving a large scale project. Real world large scale projects are inherently ambiguous and ill-defined. In completing this exercise, participants are asked to assume a role and to respond appropriately to the scenario and updates to the scenario.

Prompts and response alternatives. At step S615, after reviewing an initial scenario and again at steps S625, S635, S645, after each of eight updates to the scenario, participants are presented with a fixed set of specific actions or responses developed by experts, respectively, at steps S620, S630, 640 and S650. Participants are asked to respond to the initial scenario in the following way:

Select the steps NECESSARY and ESSENTIAL for dealing with the situation.

Also, mark the steps which are definitely INAPPROPRIATE at this time.

After selecting a set of necessary/essential and inappropriate field actions, the participants are presented with a series of eight scenario updates, each containing new information. Each of these eight updates is accompanied by the same fixed list of potential actions, with currently selected necessary/essential and inappropriate actions identified. After each update, the participants are asked to again update their action steps as follows:

Revue the steps NECESSARY and ESSENTIAL for dealing with the situation.

Also, revise the steps which are definitely INAPPROPRIATE at this time.

Information within each update is structured to represent a two of four possible combinations of two dimensions: high and low salience, and high and low diagnosticity. Salient information is simply information that is easily noticed; while diagnostic information has implications for executive decisions. Thus, some information may be low in salience, which is subtle or easily overlooked, and yet have strong implications for the need to take specific actions; other information may be high in salience, yet have no bearing on the actions taken.

Each update may contain three types of content information such as: the country's political stability, the attitude of the populace, and the changing nature of the project. This variety of content is intended to make the scenarios more realistic and complex, and to reduce the likelihood of response sets by participants. For the initial scenario and each update, participants first review the information provided, and then they indicate which operations are Necessary and Essential for dealing with the situation and which are Definitely Inappropriate at this time. Thus, the exercise presents nine opportunities to select actions as necessary/essential and as inappropriate: once when presented with the initial problem scenario, and then in response to the eight updates. These actions selections form the basis for scoring the measure. Choice patterns provide an estimate of the participant's skill in reevaluating prior understandings of a situation over time in the light of new information.

Each response alternative has been evaluated by experts as to whether or not it is necessary/essential or inappropriate as a response to the initial scenario and to each update. It is assumed that individuals high in metacognitive processing skill are more likely to select actions in accord with the expert's judgments than those low in metacognitive processing skill.

Scoring. At step S655, scores are obtained for responses to the initial scenario and each of the eight updates will be based on the number of properly selected actions. For the scenario and each update, the available actions may be classified into one of three categories:

1. Actions that are necessary and essential and, therefore, should be carried out;
2. Actions that are definitely inappropriate and should not be carried out;
3. All other actions.

Participant's choices in each of these three categories are used to derive the scores described in Table 9.

TABLE 9

SCORES OBTAINED FROM THE
METACOGNITIVE PROCESS MEASURE

Construct Quality Scores: Two types of Metacognitive Process construct scores are derived from responses to the initial scenario and to each of the eight updates.

TABLE 9-continued

SCORES OBTAINED FROM THE
METACOGNITIVE PROCESS MEASURE

Quality: Based on the proportion of available responses from among those which reflect high levels of skill, Quality Scores are calculated.
These scores are defined as:
The proportion of selections available that the participant accurately selects as necessary/essential given the information provided;
The proportion of selections available that the participant accurately selects as inappropriate given the information provided; and
The proportion of selections available that the participant accurately selects as necessary/essential plus those he/she accurately selects as inappropriate.
Maximum Quality: This is the ratio of the total number of points received for accurately selecting necessary/essential and inappropriate responses compared to the maximum number of points possible; where the maximum number of points is 54, calculated as the number of response alternatives (i.e., 17) times the maximum number of points per correct response (i.e., 3).
Total Scores: Three overall scores for Metacognitive Process are calculated across the initial scenario and eight updates:
1. Selection Quality Score, an average of the nine Quality Scores;
2. Maximum Quality Score, an average of the nine Maximum Quality Scores;
3. Overall Metacognitive Process Score, twice the Quality Score plus the Maximum Quality score.

Summary of MLE Measures and Scores

Each of the six metacognitive problem-solving skills measures yield several scores related to the constructs covered by that measure. These scores include the following:

Quality scores. Five quality scores are calculated for four of the six MLE measures (i.e., General Problem Solving, Solution Construction, Social Judgment, and Planning & implementation). These quality scores are as follows:

Quality Score #1 (#HI/#AVAIL): The proportion of high quality responses selected from among all of those available for all questions related to the construct. This score is akin to traditional measures of the proportion of correct responses (defined here as those with high effectiveness ratings) to those available.

Quality Score #2 (#HI/#PICKED): The proportion of high quality responses selected from among all of those selected by the participant for all questions related to the construct. This score takes into account the total number of responses selected by the participant.

Quality Score #3 ((#HI+MED)/#AVAIL): The proportion of high and medium quality responses selected from among all of those available for all questions related to the construct. This score is akin to traditional measures of the proportion of correct responses (defined as those with high and medium effectiveness ratings) to those available.

Quality Score #4 ((#HI+MED)/#PICKED): The proportion of high and medium quality responses selected from among all of those selected by the participant for all questions related to the construct. This score takes into account the total number of responses selected by the participant.

Average Quality Score (Average of Quality Scores 1, 2, 3, and 4): The average of quality scores I through 4, calculated for each of five measures included in the MLE.

Completeness scores. Completeness scores are calculated for two of the MLE measures (General Problem Solving and Planning & Implementation). These scores represent "breadth of coverage" of the participant's responses and were calculated as the percentage of responses keyed to various subconstructs which were selected from among those possible for all questions related to the construct.

Sequence scores. Sequence scores are calculated for two of the MLE measures (General Problem Solving and Planning & Implementation). These scores represent the "correctness of the ordering or prioritization" of the participant's responses and were calculated as the percentage of responses which were correctly ordered or prioritized for all questions related to the construct.

Total score for Solution Evaluation Measure. For the Solution Evaluation Measure, a single fixed score, derived from an average of the participant's individual ratings for six paired problem solution comparisons was calculated.

Maximum quality for Metacognitive Process Measure. In addition to the five quality scores, for the Metacognitive Process measure only, a Maximum Quality score is calculated:

Maximum Quality Score. This score is calculated taking into account the number of responses the participant selected as essential and inappropriate, matching the ratings by SMEs. This score also took into account the number of responses selected as essential and inappropriate, but identified as neither essential nor inappropriate by the SMEs.

Total measure scores. Total or overall measure scores are calculated for all six measures. This score was a composite of the quality, completeness, and sequence scores available for each of the measures, where quality was rated by SMEs as twice important as the completeness and/or sequence scores in effective problem solving. The total measure scores were calculated for each measure as two times the measure's quality score plus its completeness and sequence score (as available).

In addition to the individual measure scores, the MLE battery yields a summary battery score:

Battery score. The total battery score 700 is the sum of the Total Measure Scores across all six MLE measures. This measure takes into account the weighted average quality score plus any available completeness or sequence scores. The total battery score 700 may be processed to obtain a data base norm calculation 800, which normalizes the results of the test takers with respect to the results of others in a set of tests taken.

Summary of MLE Design Criteria and Performance Model

MLE measures were developed to have the following characteristics: high complexity, domain specificity, a low level of fidelity, and a variety of construct-based, fixed response formats. Since these design features are characteristics of current measures of high-level cognitive skills, the MLE measures incorporate features that allow defensible inferences to be made about the nature of the targeted metacognitive skills.

The general MLE task performance model is a hybrid of conventional human performance and cognitive process models, and is consistent with observations concerning the nature of complex metacognitive skills. It summarizes our understanding of how people apply metacognitive skills to complex problems in real-world settings, and specifies how tasks might be decomposed into distinct components and subcomponents.

Each exercise begins by presenting a scenario, that is, a domain-specific controlled simulation task. This scenario is intended to activate relevant schema and problem solving processes, resulting in the construction of a mental representation of the problem and a set of alternative solutions.

A given scenario may be decomposed into two or more parts based on content. For example, people may first be presented with a statement containing background information about the problem. Next, relevant factual information may be presented, followed by goals and restrictions constraining the nature of possible solutions. By decomposing scenarios based on content, differences in the way people attend to different kinds of information may be assessed.

Having activated relevant scheme and problem solving processes, a series of queries or prompts with accompanying response options are presented. These prompts define the bases for choosing particular options over others and are designed to reflect constructs influencing the application of the targeted metacognitive skill.

Summary of MLE Software Decoding Characteristics and Platform

Conditions of administration are a critical aspect of assessment design. In the MLE, computer administration provides several benefits. First, it allows time-on-task measures to be captured. Second, computer administration is less effortful from the perspective of examinees. With computer administration, a task may be programmed in various ways to maintain the interest of examinees, without changing the substance or nature of the basic task structure. Third, computer administration may enhance the fidelity of the simulations since examinees work through each task at their own pace and respond in ways tailored to the presentation of the task and the nature of each problem. Finally, and what is most important, computer administration can allow immediate, on-line scoring and performance feedback. This feedback capability should enhance the acceptance of the assessment process by examinees and yield more reliable data overall. Further, the database used by the scoring and feedback system for the assessments may be continually updated, allowing normative data to be collected over time.

The observational design makes it possible to specify multiple objects of measurement. Observations are taken from the various components and subcomponents of the tasks. Specifically, these observations consist of time-on-task and scores based on specific constructs keyed to the response options. Wherever possible, the MLE was designed to provide multiple measures of metacognitive skill for each task component and task subcomponent. From these observations, a comprehensive set of performance indices is derived, representing general metacognitive skill, strategic application of the skill, and the constructs contributing to skill level and its application.

The MLE measures are designed to be computer-administered. The MLE software design characteristics include the following:

Standard "look and feel",

Randomization of measures, prompts, and response alternatives,

Accurate stimulus presentation and response recording,

Verification of participant's responses,

On-line data logging and scoring, and

Security and administrative control.

The MLE software is comprised of three modules: (1) the Instructions Module; (2) the MLE's Exercises; and (3) the Authoring System.

Instructions Module. The Instructions Module introduces participants to the MLE, describing the various presentation styles or modes and the ways in which the participants will respond to the exercises. This module is automatically installed with the MLE and takes about 15 minutes to complete.

MLE Exercises. The MLE exercises are designed to administer the measures, record the participant's responses, and to provide on-line scoring. The MLE Exercises are automatically installed and take approximately 2 to 2½ hours to complete.

MLE Authoring System. The MLE exercises are reconfigurable (within the capabilities of the presentation response modes currently supported) via a designer-defined ASCII script file which defines specific prompts and choices, and selects the appropriate presentation format. Response data are then captured based on the type of presentation format selected. Among the available response formats are the following:

Initial Prompt Response Tunes

Likert-type rating scale: Pick one on the 5-point rating scale.

Multiple choice: Pick at least X of Y choices

Multiple choice: Pick at most X of Y choices

Multiple choice: Pick from X to Y of Z choices

Reorder previously made choices

0 Rate paired comparisons on a 4-point Likert-type scale.

Retention of Choices for Future Prompt Responses

Retain all previous choice alternatives

Retain selected choices

Retain all choice alternatives plus selected choices

The MLE can be administered on a standard software platform, which consists of the following:

IBM-compatible computer

4 MB of RAM 2.5 MB available hard disk space

Microsoft Windows 3.0 or higher 3.5 high-density disk drive 1-1 VGA or higher resolution monitor Microsoft-compatible mouse or track ball 11 MLE Install disk with Instructions Module and MLE Executable.

Installation and execution of the Instruction Module and the MLE Exercises is straightforward via a Windows-based installation program. As participants complete the MLE, a log file is saved onto the hard drive. Upon completion of the MLE or exiting before completion, the log file is also saved back to the data diskette, in a flat ASCII text file, which may be imported into any database or spreadsheet which respects space-delimited text files. Feedback in the form of a MLE profile score is generated for candidate and examiner use.

Although described in relation to management assessment, the invention may be employed to assess metacognitive abilities with respect to any capacity. The invention is not limited to the particular embodiments described herein, rather only to the appended claims.

I claim:

1. Computer-based apparatus for assessing organizational leadership potential of an examinee through the use of metacognitive predictors, said metacognitive predictors representing higher order metacognitive processes, said apparatus comprising:

means for storing a database of queries representative of organizational leadership skills of the examinee required for at least one organizational leadership position, each query comprising a prompt and associated statements, wherein the leadership position has metacognitive skills of general problem solving, planning and implementation, solution construction, solution evaluation, social judgment, and metacognitive processes, associated therewith;

means for presenting to the examinee a scenario configured to activate at least one of a schema and a problem solving process, resulting in mental representation of a problem and alternative solutions therefor, each scenario being defined by at least one query and prompt, comprising a simulation designed to assess at least one of the metacognitive skills of general problem solving, planning and implementation, solution construction, solution evaluation, social judgment, and metacognitive processes, associated with the organizational leadership position, and being designed to assess the organizational leadership potential of the examinee;

means for selecting a query from the database of queries;

means for presenting to the examinee the query;

means for receiving from the examinee a response comprising at least one of the statements; and means for scoring the response and generating a result, the result including a profile displaying percentile scores for the examinee's performance measures against continuously updated normative data;

wherein the queries are configured such that the result will be substantially similar for all of the queries.

2. Computer-based apparatus of claim 1, wherein the means for selecting selects a query to promote at least one of face validity, content validity, construct validity and criterion related validity.

3. Computer-based apparatus of claim 1, wherein the scenario further comprises at least one of a problem description, a resources available description, a logistical issues description and a current status description.

4. Computer-based apparatus of claim 1, wherein at least one of the query is configured to promote a response indicative of and said means for scoring is configured to ascertain capability with respect to at least one of:

general problem solving, problem construction, information encoding, category re-conceptualization, idea evaluation, identifying implementation needs, solution construction, solution implementation, solution monitoring, comparing features, mapping choices, justifying choices, social judgment, metacognitive processes, reducing ambiguity, furthering organizational goals, balancing quantity versus quality of resources to be utilized, balancing risk versus gain, at least one of stabilizing and developing a team, efficiency, identifying appropriateness, identifying breadth of coverage, identifying perceptions, identifying team performance considerations, social judgment, good judgment under uncertainty and sensitivity to fit.

5. Computer-based apparatus of claim 4, wherein said means for presenting a query is configured to generate a display with an appearance that is consistent regardless of what the query promotes.

6. Computer-based apparatus of claim 1, wherein said means for presenting a query is configured to order the statements in a logical order or a random order.

7. Computer-based apparatus of claim 1, wherein said means for presenting a query is configured to instruct that a response at least one of:

rate a statement with respect to a scale, select at least a minimum number of statements from a plurality of statements, select no more than a maximum number of statements from a plurality of statements, select a number of statements, ranging from a minimum to a maximum number of statements, from a plurality of statements, reorder previously selected statements, and comparatively rate a plurality of statements.

8. Computer-based apparatus of claim 1, further comprising means for measuring an amount of time from when the scenario is presented and/or the query is presented to the examinee until the response is received.

9. Computer-based apparatus of claim 1, further comprising means for verifying whether the response is at least one of a correct type and includes a correct number of statements.

10. Computer-based apparatus of claim 1, further comprising means for providing the result to an individual.

11. Computer-based apparatus of claim 1, wherein said means for presenting a scenario is configured to update the scenario or present a second scenario, based on the response, configured to at least one of activate a second schema and activate a second problem solving process, resulting in mental representation of a second problem and solutions therefor.

12. Computer-based apparatus of claim 11, further comprising means for providing the result to an individual, wherein said means for providing the result is configured and/or said means for presenting a scenario is configured so that the result is provided prior to the scenario updating or presenting of a second scenario.

13. Computer-based apparatus of claim 1, wherein the measures are weighted in predetermined amounts.

14. Method of assessing organizational leadership potential of an examinee through the use of metacognitive predictors, said metacognitive predictors representing higher order metacognitive processes, said method comprising the steps of:

presenting a scenario configured to activate at least one of a schema and a problem solving process, resulting in mental representation of a problem and alternative solutions therefor, the scenario comprising a simulation designed to assess at least one metacognitive skill of general problem solving, planning and implementation, solution construction, solution evaluation, social judgment, and metacognitive processes, said metacognitive skills of general problem solving, planning and implementation, solution construction, solution evaluation, social judgment, and metacognitive processes being associated with at least one organizational leadership position, and said simulation further being designed to assess the organizational leadership potential of the examinee;

presenting a query comprising a prompt and associated statements, the query being representative of organizational leadership skills of the examinee required for the organizational leadership position, the scenario being defined by at least one query and prompt;

receiving a response comprising one or more of the statements; and scoring the response; and generating a result based on said step of scoring the response, the result including a profile displaying percentile scores for the examinee's performance measures against continuously updated normative data;

wherein the query is selected from a plurality of queries; and wherein the queries are configured such that said step of scoring will generate a substantially similar result for all of the queries.

15. Method of claim 14, further comprising a step of selecting a query to promote at least one of face validity, content validity, construct validity and criterion related validity.

16. Method of claim 14, further comprising, prior to said step of presenting a query, a step of selecting a query from the plurality of queries.

17. Method of claim 14, wherein the scenario comprises at least one of:

a problem description, a resources available description, a logistical issues description and a current status description.

18. Method of claim 14, wherein at least one of said step of presenting a query is configured to promote a response indicative of and said step of scoring comprises ascertaining capability with respect to at least one of:

general problem solving, problem construction, information encoding, category re-conceptualization, idea evaluation, identifying implementation needs, solution construction, solution implementation, solution monitoring, comparing features, mapping choices, justifying choices, social judgment, metacognitive processes, reducing ambiguity, furthering organizational goals, balancing quantity versus quality of resources to be utilized, balancing risk versus gain, at least one of stabilizing and developing a team, efficiency, identifying appropriateness, identifying breadth of coverage, identifying perceptions, identifying team performance considerations, social judgment, good judgment under uncertainty and sensitivity to fit.

19. Method of claim 18, wherein said step of presenting a query comprises generating a display with an appearance that is consistent regardless of what the query promotes.

20. Method of claim 14, wherein said step of presenting a query comprises a step of ordering the statements in a logical order or a random orders.

21. Method of claim 14, wherein said step of presenting a query comprises a step of instructing that a response at least one of:

rate a statement with respect to a scale, select at least a minimum number of statements from a plurality of statements, select no more than a maximum number of statements from a plurality of statements, select a number of statements, ranging from a minimum to a maximum number of statements, from a plurality of statements, reorder previously selected statements, and comparatively rate a plurality of statements.

22. Method of claim 14, further comprising a step of measuring an amount of time from at least one of said step of presenting a scenario and said step of presenting a query until said step of receiving a response.

23. Method of claim 14, further comprising a step of verifying whether the response is of a correct type and/or includes a correct number of statements.

24. Method of claim 14, further comprising a step of providing the result to an individual.

25. Method of claim 14, further comprising a step of updating the scenario or presenting a second scenario, based on the response, configured to activate a second schema and/or activate a second problem solving process, resulting in mental representation of a second problem and alternative solutions therefor.

26. Method of claim 25, further comprising a step of providing the result to an individual prior to said step of updating the scenario or presenting a second scenario.

27. Method of claim 14, wherein the measures are weighted in predetermined amounts.

28. Method of assessing organizational leadership potential of an examinee through the use of metacognitive predictors, said metacognitive predictors representing higher order metacognitive processes, said method comprising the steps of:

presenting a scenario configured to activate at least one of a schema and a problem solving process, resulting in mental representation of a problem and alternative solutions therefor, the scenario comprising a simulation designed to assess at least one metacognitive skill of general problem solving, planning and implementation, solution construction, solution evaluation, social judgment, and metacognitive processes, said metacognitive skills of general problem solving, planning and implementation, solution construction, solution evaluation, social judgment, and metacognitive processes being associated with at least one organizational leadership position, and said simulation further being designed to assess the organizational leadership potential of the examinee;

presenting a query comprising a prompt and associated statements, the query being representative of organizational leadership skills of the examinee required for the organizational leadership position, the scenario being defined by at least one query and prompt;

wherein the query is configured to promote a response indicative of ability with respect to at least one of:

general problem solving, problem construction, information encoding, category re-conceptualization, idea evaluation, identifying implementation needs, solution construction, solution implementation, solution monitoring, comparing features, mapping choices, justifying choices, social judgment, metacognitive processes, reducing ambiguity, furthering organizational goals, balancing quantity versus quality of resources to be utilized, balancing risk versus gain, at least one of stabilizing and developing a team, efficiency, identifying appropriateness, identifying breadth of coverage, identifying perceptions, identifying team performance considerations, social judgment, good judgment under uncertainty and sensitivity to fit;

receiving a response comprising one or more of the statements;

scoring the response; and generating a result based on said step of scoring the response, the result including a profile displaying percentile scores for the examinee's performance measures against continuously updated normative data.

29. Method of claim 28, further comprising a step of selecting a query to promote at least one of face validity, content validity, construct validity and criterion related validity.

30. Method of claim 28, further comprising, prior to said step of presenting a query, a step of selecting a query from a plurality of queries.

31. Method of claim 30, wherein the query is configured to promote a response indicative of at least one of:

general problem solving, problem construction, information encoding, category re-conceptualization, idea evaluation, identifying implementation needs, solution construction, solution implementation, solution monitoring, comparing features, mapping choices, justifying choices, social judgment, metacognitive processes, reducing ambiguity, furthering organizational goals, balancing quantity versus quality of resources to be utilized, balancing risk versus gain, at least one of stabilizing and developing a team, efficiency, identifying appropriateness, identifying breadth of coverage, identifying perceptions, identifying team performance considerations, social judgment, good judgment under uncertainty and sensitivity to fit.

32. Method of claim 28, wherein the scenario comprises at least one of:

a problem description, a resources available description, a logistical issues description and a current status description.

33. Method of claim 28, wherein said step of presenting a query comprises generating a display with an appearance that is consistent regardless of what the query promotes.

34. Method of claim 28, wherein said step of presenting a query comprises a step of ordering the statements in a logical order or a random order.

35. Method of claim 28, wherein said step of presenting a query comprises a step of instructing that a response at least one of:

rate a statement with respect to a scale, select at least a minimum number of statements from a plurality of statements, select no more than a maximum number of statements from a plurality of statements, select a number of statements, ranging from a minimum to a maximum number of statements, from a plurality of statements; reorder previously selected statements, and comparatively rate a plurality of statements.

36. Method of claim 28, further comprising a step of measuring an amount of time from at least one of said step of presenting a scenario and said step of presenting a query until said step of receiving a response.

37. Method of claim 28, further comprising a step of verifying whether the response is of a correct type and/or includes a correct number of statements.

38. Method of claim 28, further comprising a step of providing the result to an individual.

39. Method of claim 28, further comprising a step of updating the scenario or presenting a second scenario, based on the response, configured to at least one of activate a second schema and activate a second problem solving process, resulting in mental representation of a second problem and alternative solutions therefor.

40. Method of claim 39, further comprising a step of providing the result to an individual prior to said step of updating the scenario or presenting a second scenario.

41. Method of claim 28, wherein the measures are weighted in predetermined amounts.

42. Method of claim 28, wherein said scoring comprises generating a quality score corresponding to a proportion of statements of the response compared to a number of statements associated with the query.

43. Method of claim 28, wherein said scoring comprises generating a sequence score corresponding to a correctness of sequencing of the statements compared to a maximum possible correctness score.

44. Method of claim 43, wherein said scoring comprises generating a quality score corresponding to a proportion of statements of the response compared to a number of statements associated with the query, further comprising generating a total score comprising a sum of the sequence score plus twice the quality score.

45. Method of claim 28, further comprising generating a completeness score corresponding to a percentage of responses pertaining to at least one of:

general problem solving, problem construction, information encoding, category re-conceptualization, idea evaluation, identifying implementation needs, solution construction, solution implementation, solution monitoring, comparing features, mapping choices, justifying choices, social judgment, metacognitive processes, reducing ambiguity, furthering organizational goals, balancing quantity versus quality of resources to be utilized, balancing risk versus gain, at least one of stabilizing and developing a team, efficiency, identifying appropriateness, identifying breadth of coverage, identifying perceptions, identifying team performance considerations, social judgment, good judgment under uncertainty and sensitivity to fit.

46. Method of claim 45, wherein said scoring comprises generating a quality score corresponding to a proportion of statements of the response compared to a number of statements associated with the query, further comprising generating a total score comprising a sum of the twice the quality score plus the completeness score.

47. Method of claim 28, further comprising presenting one or more additional queries, each query comprising a prompt and associated statements;

wherein each of the additional queries is configured to promote a response indicative of at least one of:

general problem solving, problem construction, information encoding, category re- conceptualization, idea evaluation, identifying implementation needs, solution construction, solution implementation, solution monitoring, comparing features, mapping choices, justifying choices, social judgment, metacognitive processes, reducing ambiguity, furthering organizational goals, balancing quantity versus quality of resources to be utilized, balancing risk versus gain, at least one of stabilizing and developing a team, efficiency, identifying appropriateness, identifying breadth of coverage, identifying perceptions, identifying team performance considerations, social judgment, good judgment under uncertainty and sensitivity to fit;

receiving at least one additional response comprising at least one of the statements of the additional query;

scoring the at least one additional response;

generating a quality score for each response based on said scoring; and generating an average quality score comprising the sum divided by the number of quality scores generated.

* * * * *